(12) United States Patent
Hirai et al.

(10) Patent No.: US 12,625,582 B2
(45) Date of Patent: May 12, 2026

(54) INFORMATION PROCESSING DEVICE, INFORMATION PROCESSING SYSTEM, INFORMATION PROCESSING METHOD, AND COMPUTER-READABLE MEDIUM

(71) Applicant: Panasonic Automotive Systems Co., Ltd., Kanagawa (JP)

(72) Inventors: Atsushi Hirai, Tokyo To (JP); Yuji Hashimoto, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/926,009

(22) Filed: Oct. 24, 2024

(65) Prior Publication Data

US 2025/0138679 A1 May 1, 2025

(30) Foreign Application Priority Data

Oct. 26, 2023 (JP) ................................ 2023-184239
Sep. 10, 2024 (JP) ................................ 2024-156485

(51) Int. Cl.
*G06F 3/042* (2006.01)
*G06F 3/01* (2006.01)
*G06T 7/70* (2017.01)

(52) U.S. Cl.
CPC .............. *G06F 3/042* (2013.01); *G06F 3/011* (2013.01); *G06T 7/70* (2017.01); *G06F 2203/04108* (2013.01); *G06T 2207/30196* (2013.01)

(58) Field of Classification Search
CPC ................. G06F 3/017; G06F 3/04886; G06F 2203/04108
See application file for complete search history.

(56) References Cited

U.S. PATENT DOCUMENTS

| | | | | |
|---|---|---|---|---|
| 10,152,158 | B2 | 12/2018 | Nakagawa | |
| 10,838,488 | B2 * | 11/2020 | Gibson | .................... G06F 3/011 |
| 2010/0234094 | A1 * | 9/2010 | Gagner | ............... G07F 17/3202 |
| | | | | 463/20 |
| 2010/0333011 | A1 * | 12/2010 | Kornev | ............... G06F 3/04886 |
| | | | | 345/173 |
| 2011/0224507 | A1 * | 9/2011 | Banet | .................... A61B 5/6824 |
| | | | | 600/301 |

(Continued)

FOREIGN PATENT DOCUMENTS

| | | |
|---|---|---|
| JP | 5341126 | 11/2013 |
| JP | 6463963 | 2/2019 |

*Primary Examiner* — Bipin Gyawali

(74) *Attorney, Agent, or Firm* — Greenblum & Bernstein, P.L.C.

(57) ABSTRACT

An information processing device according to an aspect of the present disclosure includes a memory and a processor. A program is stored in the memory. The processor coupled to the memory and, by executing the program, configured to: detect a position of an operator; detect a predetermined action of the operator in an operation region indicating a region that is defined by connecting the position of the operator and an operation target region set on at least one electronic device; execute processing associated with the operation target region when detecting the predetermined action; and expand the operation region in a case in which the position of the operator is outside a region in front of the at least one electronic device.

20 Claims, 22 Drawing Sheets

(56)          References Cited

U.S. PATENT DOCUMENTS

| | | | | |
|---|---|---|---|---|
| 2012/0235904 | A1* | 9/2012 | Plagemann | G06F 3/0304 |
| | | | | 345/158 |
| 2013/0229396 | A1* | 9/2013 | Huebner | G06F 3/1446 |
| | | | | 345/207 |
| 2014/0232631 | A1* | 8/2014 | Fleischmann | G06F 18/28 |
| | | | | 345/156 |
| 2014/0361972 | A1* | 12/2014 | Kawalkar | G06F 3/005 |
| | | | | 345/156 |
| 2015/0363056 | A1* | 12/2015 | Wengelnik | G06F 3/0416 |
| | | | | 715/771 |
| 2016/0316186 | A1* | 10/2016 | Krishnakumar | G06F 3/03547 |

* cited by examiner

FIG.6

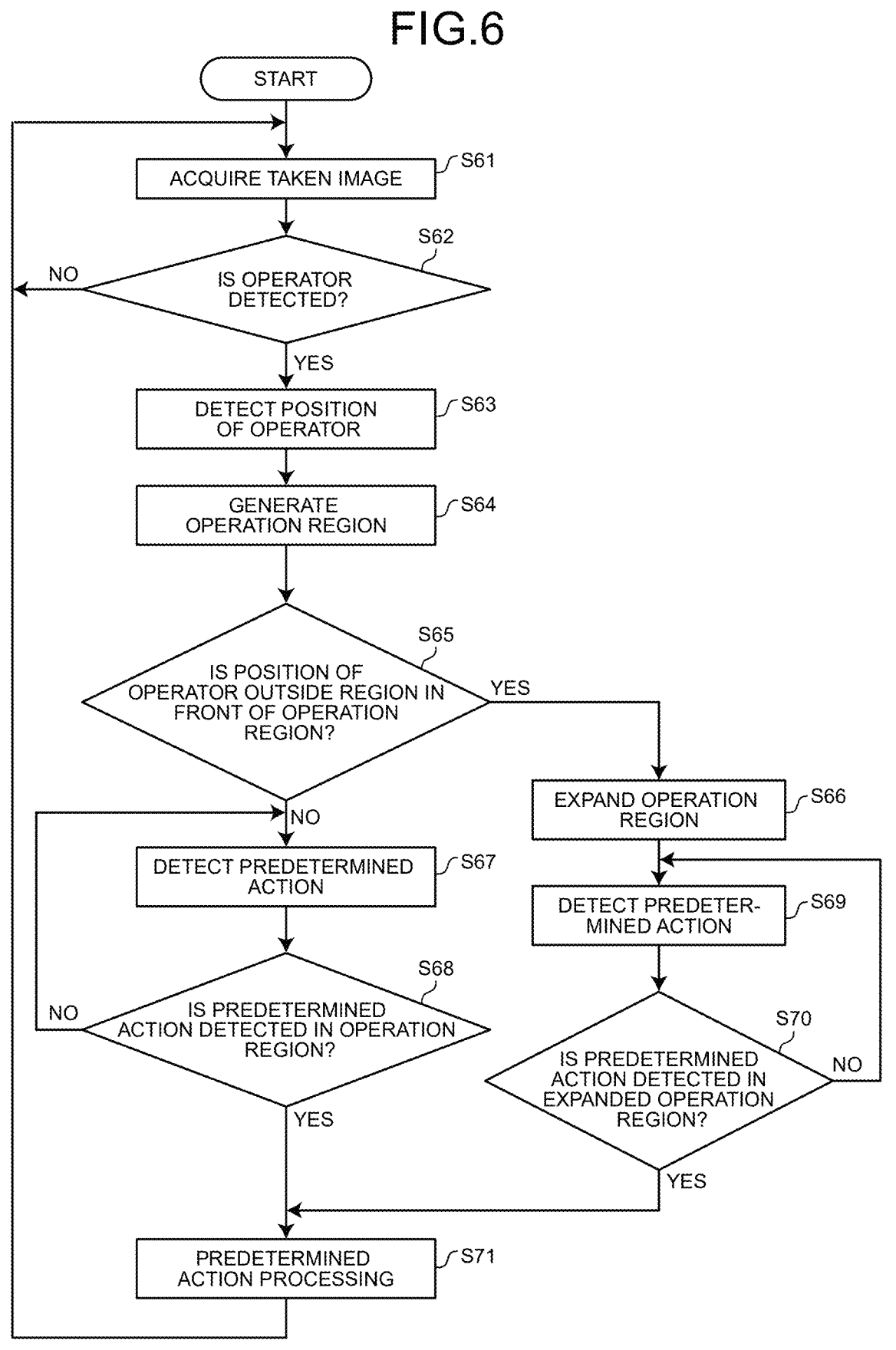

START

ACQUIRE TAKEN IMAGE — S61

IS OPERATOR DETECTED? — S62

NO

YES

DETECT POSITION OF OPERATOR — S63

GENERATE OPERATION REGION — S64

IS POSITION OF OPERATOR OUTSIDE REGION IN FRONT OF OPERATION REGION? — S65

YES

NO

EXPAND OPERATION REGION — S66

DETECT PREDETERMINED ACTION — S67

DETECT PREDETER-MINED ACTION — S69

IS PREDETERMINED ACTION DETECTED IN OPERATION REGION? — S68

NO

YES

IS PREDETERMINED ACTION DETECTED IN EXPANDED OPERATION REGION? — S70

NO

YES

PREDETERMINED ACTION PROCESSING — S71

FIG.9
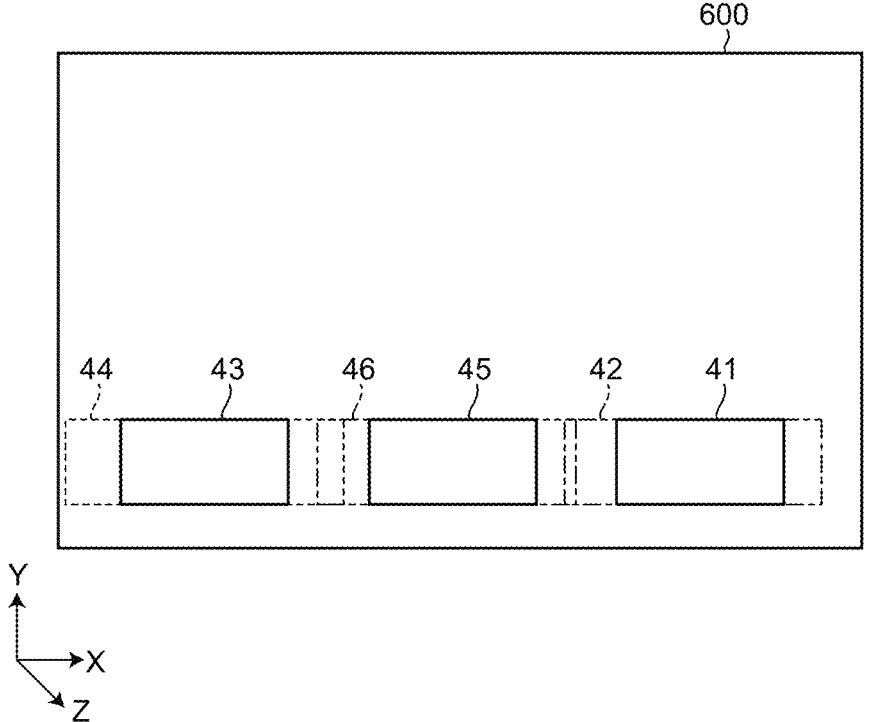
FIG.10
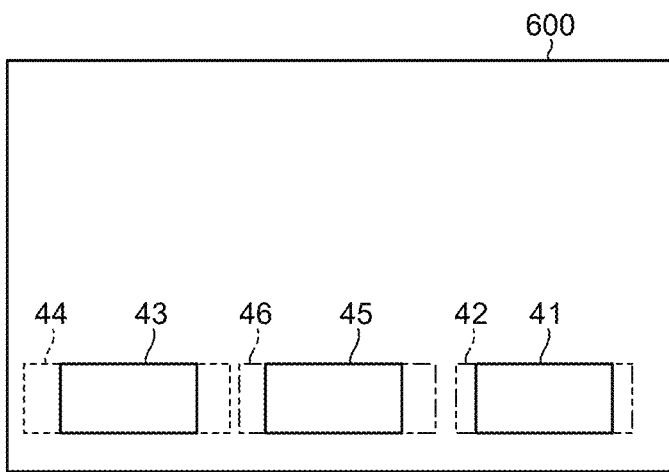
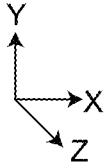
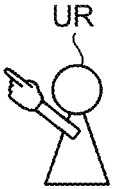

FIG.30

INFORMATION PROCESSING DEVICE, INFORMATION PROCESSING SYSTEM, INFORMATION PROCESSING METHOD, AND COMPUTER-READABLE MEDIUM

CROSS-REFERENCE TO RELATED APPLICATIONS

This application is based upon and claims the benefit of priority from Japanese Patent Application No. 2023-184239, filed on Oct. 26, 2023 and Japanese Patent Application No. 2024-156485, filed on Sep. 10, 2024, the entire contents of which are incorporated herein by reference.

FIELD

Embodiments described herein relate generally to an information processing device, an information processing system, an information processing method, and a computer-readable medium.

BACKGROUND

In the related art, regarding various electronic devices, there is known a technique of, when a user moves his/her hand without directly touching the electronic device, performing processing associated with an operation target of movement of the hand (for example, refer to Japanese Patent No. 6463963 and Japanese Patent No. 5341126). For example, in a case in which the electronic device is a display, there is known a technique of, when a user moves his/her hand without directly touching the display, changing display content on the display as the processing associated with an operation target of movement of the hand (for example, a button and the like disposed on a screen).

In the technique as described above, for example, in a case in which a position of the user is outside a region in front of the electronic device, there is the problem that it is difficult for the user to perform processing associated with the operation target such as a button, that is, to perform operation, as compared with a case in which the position of the user is inside the front region.

The present disclosure provides an information processing device, an information processing system, an information processing method, and a computer-readable medium that can improve operability for a user.

SUMMARY

An information processing device according to an aspect of the present disclosure includes a memory and a processor. A program is stored in the memory. The processor coupled to the memory and, by executing the program, configured to: detect a position of an operator; detect a predetermined action of the operator in an operation region indicating a region that is defined by connecting the position of the operator and an operation target region set on at least one electronic device; execute processing associated with the operation target region when detecting the predetermined action; and expand the operation region in a case in which the position of the operator is outside a region in front of the at least one electronic device.

BRIEF DESCRIPTION OF THE DRAWINGS

FIG. 6 is a flowchart illustrating a processing procedure of the control device according to the first embodiment;

FIG. 9 is a schematic diagram for explaining an operation target region to be expanded according to a third modification;

FIG. 10 is a schematic diagram for explaining an operation target region to be expanded according to the third modification;

FIG. 30 is a schematic diagram for explaining an example of an expanded operation target region according to the eleventh modification;

DETAILED DESCRIPTION

The following describes embodiments of an information processing device according to the present disclosure with reference to the drawings.

First Embodiment

Before describing an information processing device according to a first embodiment, the following describes a device that operates based on movement of a user's hand.

Figure 1:
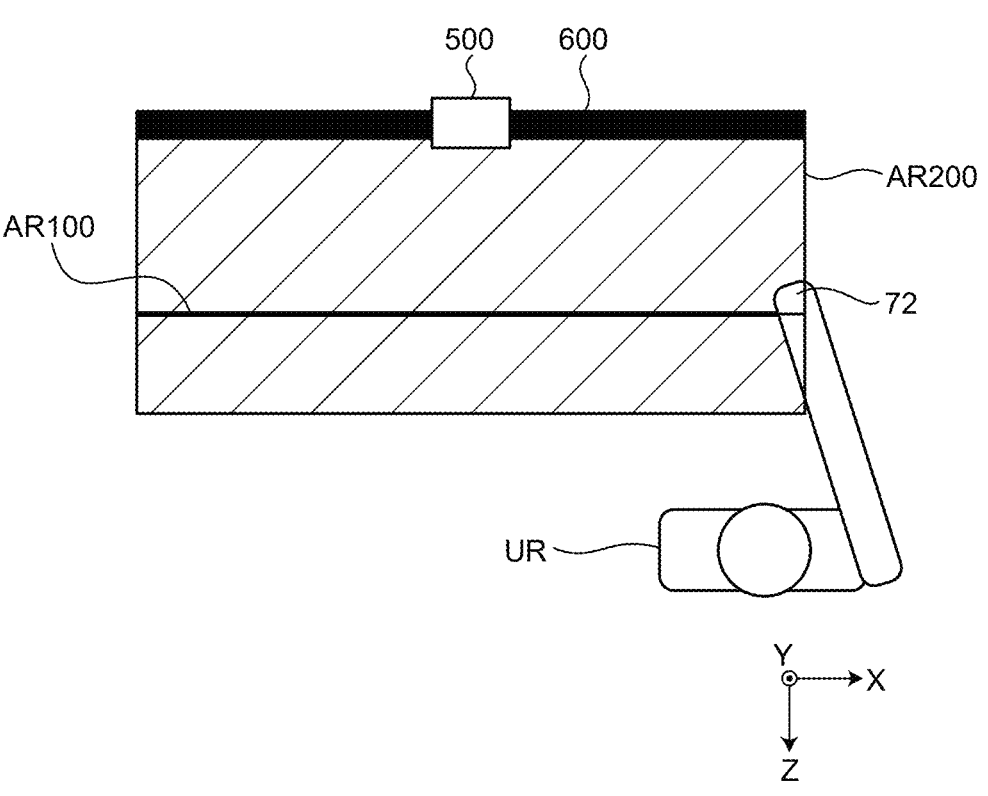
FIG. 1 is a schematic diagram illustrating an example of an information processing device.

FIG. 1 illustrates an example of the information processing device that operates based on movement of the user's hand. The information processing device includes a sensor 500 and an electronic device 600. The sensor 500 is, for example, a camera. The sensor 500 images a user UR as an operator. The user UR has arms. Herein, the arms include not only upper arms and forearms but also hands. The hand includes a fingertip 72. The electronic device 600 is, for example, a display device such as a display. The information processing device controls data displayed by the electronic device 600 based on a position of the fingertip 72 of the user UR.

For the information processing device, a virtual operation region AR100 for receiving operation on a device (for example, the electronic device 600) and a detection enabled region AR200 as a region in which movement of the fingertip 72 of the user UR can be detected are set. The detection enabled region AR200 is set in a sensing range of the sensor 500, and set in front of a display surface of the electronic device 600, for example. In a case in which the sensor 500 is a camera, the sensing range may be called an imaging range in some cases. The virtual operation region AR100 is encompassed by the detection enabled region AR200, and set as a plane parallel with the display surface of the electronic device 600 as illustrated in FIG. 1, for example.

In the configuration of FIG. 1, when the fingertip 72 enters a range closer to the electronic device 600 than the virtual operation region AR100, the information processing device determines that an operation instruction for the electronic device 600 is given, executes processing based on the operation instruction, and displays an execution result on the electronic device 600.

In FIG. 1 and the drawings related to the electronic device 600 described below, an X-axis, a Y-axis, and a Z-axis, which are orthogonal to each other, respectively mean a right and left direction, an upper and lower direction, and a front and rear direction of the electronic device 600. In the following description, in a case in which an X-direction, a Y-direction, or a Z-direction are simply described, it is assumed that they mean respective axial directions, and include two opposite directions.

In a case in which a positive direction of the X-axis is specified, it means one direction from a left-hand direction toward a right-hand direction of the user UR. In a case in which a positive direction of the Y-axis is specified, it means one direction from below to above the user UR. In a case in which a positive direction of the Z-axis is specified, it means one direction from infront of to bahind the user UR. In a case in which a negative direction of the X-axis is specified, it means one direction from the right-hand direction toward the left-hand direction of the user UR. In a case in which a negative direction of the Y-axis is specified, it means one direction from above to below the user UR. In a case in which a negative direction of the Z-axis is specified, it means one direction from behind to in front of the user UR.

Figure 2:
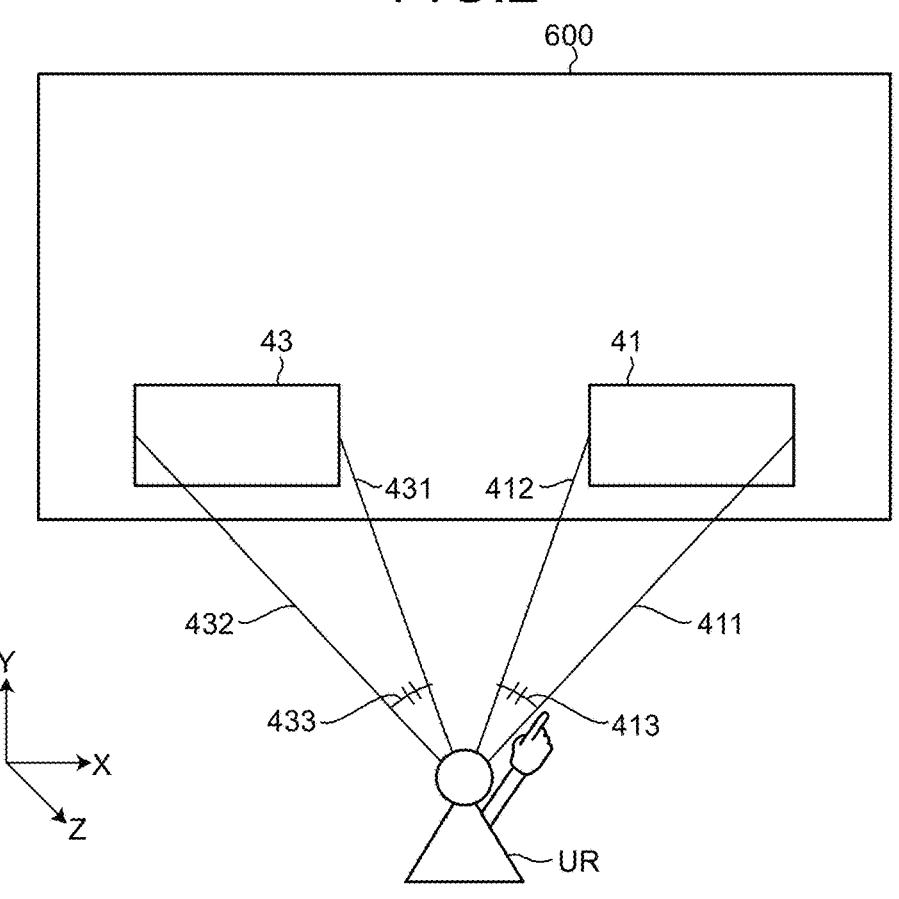
FIG. 2 is a schematic diagram for explaining operation processing of an information processing device according to a first comparative example.

FIG. 2 is a schematic diagram for explaining operation processing of the information processing device according to a first comparative example. FIG. 2 illustrates the electronic device 600, the user UR who operates the electronic device 600, and a first button 41 and a second button 43 output by the electronic device 600. The first button 41 and the second button 43 have the same size, and are positioned in substantially parallel with each other. The first button 41 and the second button 43 are assumed to be positioned symmetrically with respect to the center of the electronic device 600.

The following describes operation processing of the information processing device in a case in which the user UR operates the electronic device 600 in the air. For example, in a case in which the user UR is positioned in front of and at the center of the electronic device 600, a positional relation between the user UR and the first button 41 is the same as that between the user UR and the second button 43.

Regarding an operation angle between the user UR and the first button 41, for example, assuming that the user UR is a base point, a first operation angle 413 can be calculated based on a first straight line 411 connecting the user UR with a right end part of the first button 41 and a second straight line 412 connecting the user UR with a left end part of the first button 41. Regarding an operation angle between the user UR and the second button 43, for example, assuming that the user UR is the base point, a second operation angle 433 can be calculated based on a third straight line 431 connecting the user UR with a right end part of the second button 43 and a fourth straight line 432 connecting the user UR with a left end part of the second button 43.

Regarding the first operation angle 413 and the second operation angle 433, in a case in which the user UR is positioned in front of and at the center of the electronic device 600, the positional relation between the user UR and the first button 41 is equal to that between the user UR and the second button 43, so that the first operation angle 413 and the second operation angle 433 are also equal to each other. Thus, in a case of operating the first button 41 and the second button 43 output by the electronic device 600 in the air, the user UR can obtain equal operation feeling because the first operation angle 413 and the second operation angle 433 are equal to each other.

Figure 3:
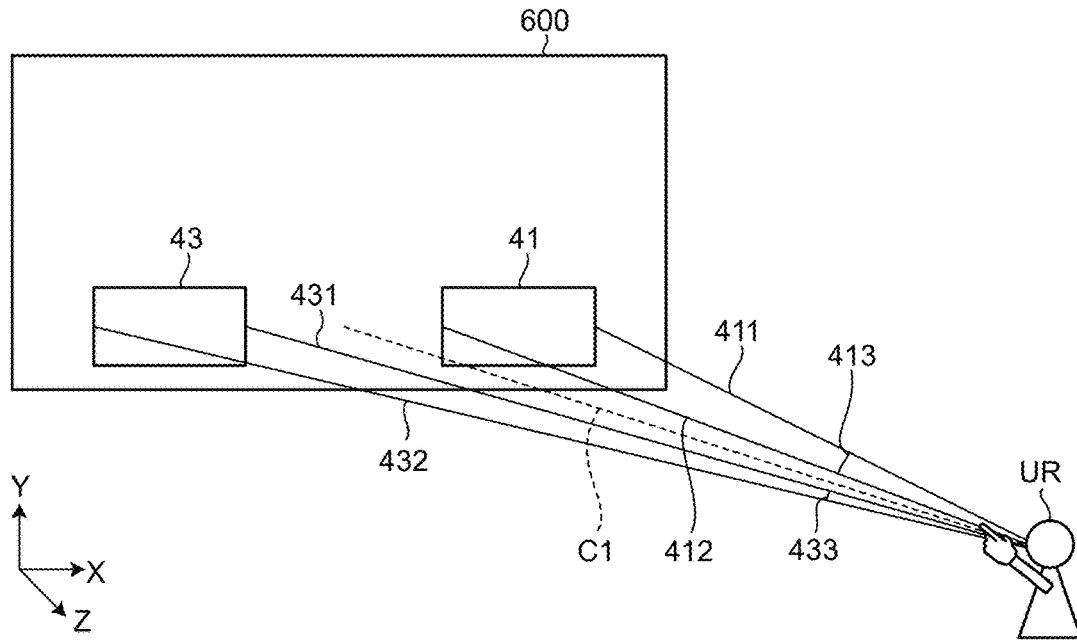
FIG. 3 is a schematic diagram for explaining operation processing of an information processing device according to a first embodiment.

FIG. 3 is a schematic diagram for explaining operation processing of the information processing device according to the first embodiment. Similarly S to FIG. 2, FIG. 3 illustrates the electronic device 600, the user UR who operates the electronic device 600, and the first button 41 and the second button 43 output by the electronic device 600.

For example, in a case in which the user UR is positioned outside a region in front of the electronic device 600, the positional relation between the user UR and the first button 41 is different from that between the user UR and the second button 43. In the positional relation between the user UR and the electronic device 600 illustrated in FIG. 3, assuming that the user UR is the base point, the first button 41 is present at a closer position than the second button 43. Thus, lengths of respective straight lines connecting the user UR and the buttons satisfy the fourth straight line 432 >the third straight line 431 >the second straight line 412 >the first straight line 411 >0. That is, the first operation angle 413 is larger than the second operation angle 433, and the operation angles are different from each other.

Due to this, in a case of operating the first button 41 and the second button 43 output by the electronic device 600 in the air, the user UR may feel that it is difficult to operate them because the first operation angle 413 and the second operation angle 433 are different from each other. Thus, the present embodiment provides the information processing device that can improve operability for the user UR in a case in which the user UR is positioned outside the region in front of the electronic device 600.

Figure 4:
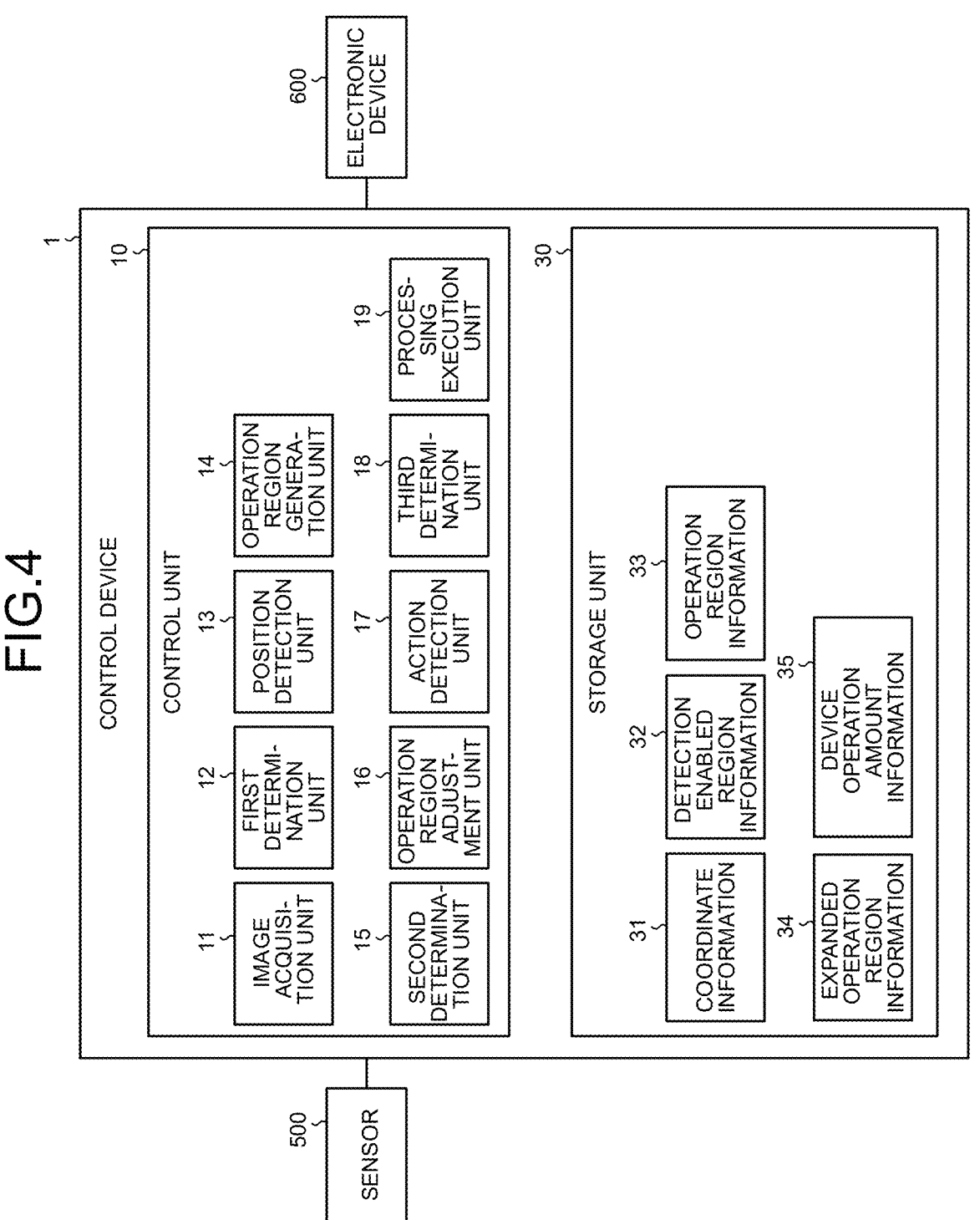
FIG. 4 is a diagram illustrating a schematic configuration of an information system including a control device as the information processing device according to the first embodiment.

FIG. 4 is a diagram illustrating a schematic configuration of an information system including a control device 1 as the information processing device according to the first embodiment. The information processing device according to the first embodiment includes the sensor 500, the electronic device 600, and the control device 1.

The sensor 500 is, for example, a camera. The sensor 500 is a visible light camera, by way of example. The sensor 500 outputs an image obtained by imaging the user UR to the control device 1. The sensor 500 is an example of an imaging unit. The sensor 500 continuously executes imaging processing, and outputs images to the control device 1. The electronic device 600 is a display unit that displays various kinds of data. The electronic device 600 is, for example, a display device such as a liquid crystal display. It is assumed that there is one electronic device 600.

The control device 1 executes processing of data displayed on the electronic device 600 in accordance with movement of the fingertip 72 of the user UR detected via the sensor 500.

The control device 1 includes a control unit 10 and a storage unit 30. The control unit 10 is configured as a central processing unit (CPU), for example, and integrally controls operation of parts of the control device 1. The control device 1 according to the present embodiment includes a read only memory (ROM) and a random access memory (RAM) (not illustrated). The ROM stores various computer programs. The RAM is a working area for the CPU at the time of executing a computer program. The control device 1 includes, for example, a processor and a memory, and implements functions of the control unit 10 and each functional block included in the control unit 10 when the processor executes a computer program stored in the memory. The CPU is an example of the processor. The storage unit 30 is an example of the memory.

By executing the computer programs stored in the ROM using the RAM as a working area, the CPU implements an image acquisition unit 11, a first determination unit 12, a position detection unit 13, an operation region generation unit 14, a second determination unit 15, an operation region adjustment unit 16, an action detection unit 17, a third determination unit 18, and a processing execution unit 19 as illustrated in FIG. 2. It can also be said that the control device 1 includes the image acquisition unit 11, the first determination unit 12, the position detection unit 13, the operation region generation unit 14, the second determination unit 15, the operation region adjustment unit 16, the action detection unit 17, the third determination unit 18, and the processing execution unit 19. The image acquisition unit 11, the first determination unit 12, the position detection unit 13, the operation region generation unit 14, the second determination unit 15, the operation region adjustment unit 16, the action detection unit 17, the third determination unit 18, and the processing execution unit 19 may be implemented by different pieces of hardware.

The storage unit 30 stores various kinds of information. The storage unit 30 is implemented by hardware for storing information (in other words, data) such as a memory or a storage. Specifically, the storage unit 30 stores coordinate information 31, detection enabled region information 32, operation region information 33, expanded operation region information 34, and device operation amount information 35.

The coordinate information 31 includes 3D coordinates of an installation position of the sensor 500, information about an attachment angle of the sensor 500, 3D coordinates of the position of the electronic device 600, and the like. The detection enabled region information 32 is coordinate information related to setting of the detection enabled region. The detection enabled region corresponds to the detection enabled region AR200 described above, and is a region in which the position or movement of the fingertip 72 of the user UR can be detected.

The operation region information 33 is coordinate information related to setting of the operation region. The operation region corresponds to the virtual operation region AR100 described above, and is a region for receiving operation by the fingertip 72 of the user UR. The expanded operation region information 34 is coordinate information related to setting of expanding the operation region described above. Content about the operation region and setting of expanding the operation region will be described later.

The device operation amount information 35 is information indicating operation of the electronic device 600 corresponding to the position of the fingertip 72 of the user UR. The operation of the electronic device 600 is, for example, depressing operation on the button output by the electronic device 600. The operation of the electronic device 600 may be also referred to as predetermined operation.

Herein, a coordinate system in the coordinate information 31, the detection enabled region information 32, the operation region information 33, the expanded operation region information 34, and the device operation amount information 35 is absolute coordinates. The coordinate system is not limited to the absolute coordinates. For example, the coordinate system may be relative coordinates based on the electronic device 600. In other words, the coordinate system may be relative coordinates based on the positional relation between the user UR and the electronic device 600.

The image acquisition unit 11 acquires a taken image obtained by imaging the user UR as an operator from the sensor 500.

The first determination unit 12 determines whether the operator is detected. Specifically, the first determination unit 12 determines whether the user UR as the operator is detected from the taken image acquired by the image acquisition unit 11. For example, in a case in which the user UR as the operator is present in the taken image acquired by the image acquisition unit 11, the first determination unit 12 determines that the operator is detected. For example, in a case in which the user UR as the operator is not present in the taken image acquired by the image acquisition unit 11, the first determination unit 12 determines that the operator is not detected.

The position detection unit 13 detects the position of the user UR based on the taken image obtained by imaging the user UR. Specifically, when the first determination unit 12 determines that the user UR as the operator is detected from the taken image acquired by the image acquisition unit 11, the position detection unit 13 detects the position of the user UR based on the taken image obtained by imaging the user UR.

The operation region generation unit 14 generates an operation region indicating a region that is defined by connecting the position of the user UR detected by the position detection unit 13 and an operation target region set on the electronic device based on the taken image obtained by imaging the user UR. The following describes the operation region generated by the operation region generation unit 14 with reference to FIG. 3.

In FIG. 3, the first button 41 and the second button 43 are operation target regions set on the electronic device, respectively. For example, in a case in which the electronic device 600 is a display, at least two operation target regions are present on the display, the operation target regions including a vicinity button region indicating a region of a vicinity button disposed closer to the operator and a distant button region indicating a region of a distant button disposed farther from the operator. In FIG. 3, the vicinity button is the first button 41, and the distant button is the second button 43.

In FIG. 3, the first operation angle 413 and the second operation angle 433 are operation regions each indicating a region that is defined by connecting the position of the user UR and the operation target region set on the electronic device. One of the operation regions is, for example, a region that is set based on a first angle indicating an angle formed by a first straight line and a second straight line, the first straight line connecting the position of the operator and one end part in a direction of a center line C1 connecting the center of the vicinity button region and the center of the distant button region of the operation region corresponding to the vicinity button region, and the second straight line connecting the position of the operator and the other end part in the direction of the center line C1 of the operation region corresponding to the vicinity button region.

In FIG. 3, assuming that one end part of the first button 41 in the direction of the center line C1 is a right end part, and the other end part of the first button 41 in the direction of the center line C1 is a left end part, for example, the first angle indicating the angle formed by the first straight line 411 connected to the position of the user UR and the second straight line 412 connected to the position of the user UR corresponds to the first operation angle 413.

The other one of the operation regions is, for example, a region that is set based on a second angle indicating an angle formed by a third straight line and a fourth straight line, the third straight line connecting the position of the operator and one end part in the direction of the center line C1 of the operation region corresponding to the distant button region, and the fourth straight line connecting the position of the operator and the other end part in the direction of the center line C1 of the operation region corresponding to the distant button region.

In FIG. 3, assuming that one end part of the second button 43 in the direction of the center line C1 is a right end part, and the other end part of the second button 43 in the direction of the center line C1 is a left end part, for example, the second angle indicating the angle formed by the third straight line 431 connected to the position of the user UR and the fourth straight line 432 connected to the position of the user UR corresponds to the second operation angle 433.

Returning to FIG. 4, the second determination unit 15 determines whether the position of the user UR is outside the region in front of the electronic device 600. Specifically, the second determination unit 15 determines whether the position of the user UR is outside the region in front of electronic device 600 based on the position of the user UR detected by the position detection unit 13.

Herein, the region in front of the electronic device 600 may be referred to as a front region. When viewed from the negative direction of the Y-axis, a straight line connecting the center of a breadth of the front region of the electronic device 600 and the center of a breadth of the electronic device 600 is vertical to a breadth direction of the front region. The breadth of the front region is equal to the breadth of the electronic device 600 in the X-axis direction. The breadth of the front region can be individually set. The breadth of the front region may be smaller than the breadth of the electronic device 600.

For example, in a case in which the electronic device 600 is horizontally long, when the user UR is positioned in the vicinity of an end part of the electronic device 600, it may be difficult to operate a part near the opposite end part of the electronic device 600. In such a case, by setting the breadth of the front region to be smaller than the breadth of the electronic device 600, the same effect can be obtained.

The breadth of the front region is, for example, set to be larger than a shoulder width of the user UR. An average value of a shoulder width of a person is substantially 0.22 times a height of the person, so that the position detection unit 13 may detect a height of the user UR from the taken image obtained by imaging the user UR, for example, and may set, as the breadth of the front region, a value obtained by multiplying a value of the detected height by 0.22.

Regarding the positional relation between the user UR and the electronic device 600 illustrated in FIG. 2, the second determination unit 15 determines that the position of the user UR is inside the region in front of the electronic device 600. Regarding the positional relation between the user UR and the electronic device 600 illustrated in FIG. 3, the second determination unit 15 determines that the position of the user UR is outside the region in front of the electronic device 600.

Returning to FIG. 4, in a case in which the position of the operator detected by the position detection unit 13 is outside the region in front of the electronic device 600, the operation region adjustment unit 16 expands the operation region. Specifically, in a case in which the second determination unit 15 determines that the position of the operator detected by the position detection unit 13 is outside the region in front of the electronic device 600, the operation region adjustment unit 16 expands the operation region generated by the operation region generation unit 14. The following describes the operation region expanded by the operation region adjustment unit 16 with reference to FIG. 5.

Figure 5:
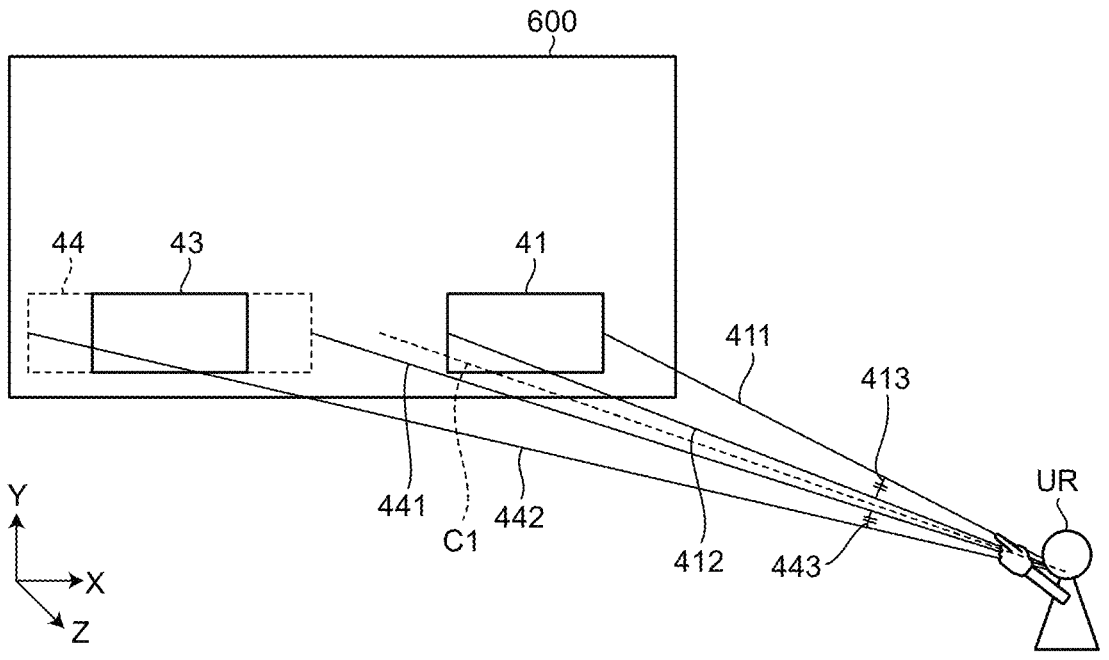
FIG. 5 is a schematic diagram for explaining an example of an operation region to be expanded according to the first embodiment.

FIG. 5 is a schematic diagram for explaining an example of the operation region to be expanded according to the first embodiment. Similarly to FIG. 3, the FIG. 5 illustrates the electronic device 600, the user UR who operates the electronic device 600, and the first button 41 and the second button 43 output by the electronic device 600.

In a case in which the second determination unit 15 determines that the position of the operator detected by the position detection unit 13 is outside the region in front of the electronic device 600, the operation region adjustment unit 16 sets the operation regions respectively corresponding to the first button region and the second button region so that the first operation angle 413 is equal to the second operation angle 433.

For example, as illustrated in FIG. 5, first, in a case of adjusting the second operation angle 433 to be equal to the first operation angle 413, the operation region adjustment unit 16 expands the operation target region of the second button 43 so that the right end part and the left end part of the second button 43 are extended from a center part of the second button 43, and sets an operation target region 44 of the second button 43. The operation region adjustment unit 16 sets magnitude of the angle so that, in the operation region corresponding to the expanded operation target region 44, the first operation angle 413 is equal to a second operation angle 443 indicating an angle formed by a third straight line 441 connecting the position of the operator and a right end part of the operation target region 44 in the direction of the center line C1, and a fourth straight line 442 connecting the position of the operator and a left end part of the operation target region 44 in the direction of the center line C1.

Due to this, the operation region adjustment unit 16 can cause the first operation angle 413 to be equal to the second operation angle 443. The operation region adjustment unit 16 then sets an operation region corresponding to the second operation angle 443.

Returning to FIG. 4, the action detection unit 17 detects predetermined action of the operator in the operation region based on the taken image obtained by imaging the user UR. Specifically, the action detection unit 17 detects the predetermined action of the operator in the operation region generated by the operation region generation unit 14 based on the taken image obtained by imaging the user UR.

The action detection unit 17 also detects the predetermined action of the operator in the operation region expanded by the operation region adjustment unit 16 based on the taken image obtained by imaging the user UR. Herein, the predetermined action indicates, for example, a state in which the fingertip 72 of the user UR is present in the operation region and touching the operation region. The predetermined action is not limited thereto.

The third determination unit 18 determines whether the predetermined action is detected. Specifically, the third determination unit 18 determines whether the action detection unit 17 detects the predetermined action of the operator in the operation region generated by the operation region generation unit 14. The third determination unit 18 also determines whether the action detection unit 17 detects the predetermined action of the operator in the operation region expanded by the operation region adjustment unit 16.

In a case in which the predetermined action is detected by the action detection unit 17, the processing execution unit 19 executes processing corresponding to the predetermined action for the operation target region. Specifically, when the third determination unit 18 determines that the predetermined action is detected by the action detection unit 17, the processing execution unit 19 executes processing corresponding to the predetermined action for the operation target region.

Subsequently, the following describes a processing procedure of the control device 1 according to the first embodiment with reference to FIG. 6. FIG. 6 is a flowchart illustrating the processing procedure of the control device 1 according to the first embodiment.

First, the image acquisition unit 11 acquires the taken image obtained by imaging the user UR from the sensor 500 (Step S61). Subsequently, the first determination unit 12 determines whether the user UR as the operator is detected from the taken image acquired by the image acquisition unit 11 (Step S62). If the first determination unit 12 determines that the operator is not detected (No at Step S62), the process proceeds to Step S61. On the other hand, if the first determination unit 12 determines that the operator is detected (Yes at Step S62), the process proceeds to Step S63.

At Step S63, the position detection unit 13 detects the position of the user UR as the operator based on the taken image (Step S63). Subsequently, the operation region generation unit 14 generates an operation region indicating a region that is defined by connecting the position of the user UR detected by the position detection unit 13 and the operation target region set on the electronic device based on the taken image obtained by imaging the user UR (Step S64).

The second determination unit 15 determines whether the position of the user UR is outside the region in front of the electronic device 600 based on the position of the user UR detected by the position detection unit 13 (Step S65). If the second determination unit 15 determines that the position of the user UR is inside the region in front of the electronic device 600 (No at Step S65), the process proceeds to Step S67. On the other hand, if the second determination unit 15 determines that the position of the user UR is outside the region in front of the electronic device 600 (Yes at Step S65), the process proceeds to Step S66.

At Step S66, the operation region adjustment unit 16 expands the operation region generated by the operation region generation unit 14 (Step S66). At Step S67, the action detection unit 17 detects the predetermined action of the operator in the operation region generated by the operation region generation unit 14 based on the taken image obtained by imaging the user UR (Step S67).

Subsequently, the third determination unit 18 determines whether the action detection unit 17 detects the predetermined action of the operator in the operation region generated by the operation region generation unit 14 (Step S68). If the third determination unit 18 determines that the predetermined action is not detected (No at Step S68), the process proceeds to Step S67. On the other hand, if the third determination unit 18 determines that the predetermined action is detected (Yes at Step S68), the process proceeds to Step S71.

At Step S69, the action detection unit 17 detects the predetermined action of the operator in the operation region expanded by the operation region adjustment unit 16 based on the taken image obtained by imaging the user UR (Step S69). Subsequently, the third determination unit 18 determines whether the action detection unit 17 detects the predetermined action of the operator in the operation region expanded by the operation region adjustment unit 16 (Step S70). If the third determination unit 18 determines that the predetermined action is not detected (No at Step S70), the process proceeds to Step S69. On the other hand, if the third determination unit 18 determines that the predetermined action is detected (Yes at Step S70), the process proceeds to Step S71.

At Step S71, the processing execution unit 19 executes processing corresponding to the predetermined action for the operation target region (Step S71). When the processing at Step S71 ends, the process proceeds to Step S61, and this processing is continuously executed during execution of the control device 1.

As described above, the control device 1 according to an aspect of the present disclosure detects the position of the operator, and detects the predetermined action of the operator in the operation region indicating the region that is defined by connecting the detected position of the operator and the operation target region set on the electronic device. In a case in which the predetermined action is detected, the control device 1 executes the processing associated with the operation target region. If the position of the operator is outside the region in front of the electronic device, the control device 1 expands the operation region.

Due to this, for example, when the control device 1 expands the operation region in a case in which the position of the operator is outside the region in front of the electronic device 600, the operator can operate the distant button displayed on the electronic device 600 similarly to the vicinity button. Thus, the control device 1 can improve operability for the user.

The embodiment described above can be appropriately modified and implemented by changing part of configurations or functions of the devices described above. Thus, the following describes some modifications of the embodiment described above as other embodiments. The following mainly describes differences from the embodiment described above, and the same points as the content that has been already described will not be described in detail.

First Modification

Figure 7:
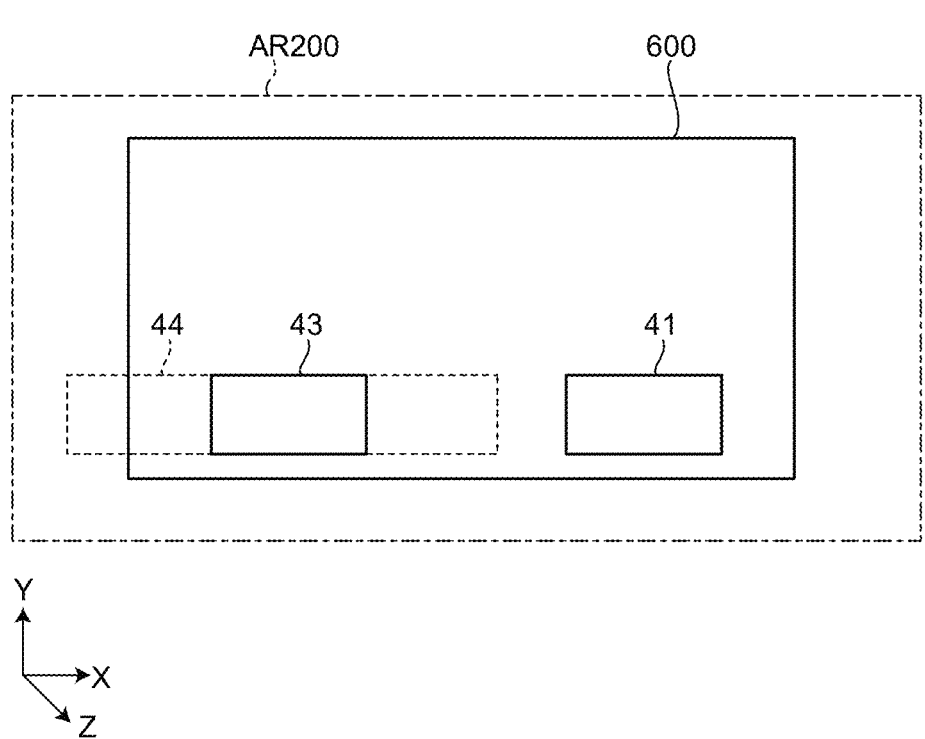
FIG. 7 is a schematic diagram for explaining an example of an operation target region to be expanded according to a first modification.

For example, the control device 1 may expand the operation target region corresponding to the button of the electronic device 600 to overlap a region outside the electronic device 600 so long as the operation target region is inside the detection enabled region AR200. The following describes the operation target region to be expanded according to a first modification with reference to FIG. 7. FIG. 7 is a schematic diagram for explaining an example of the operation target region to be expanded according to the first modification.

FIG. 7 illustrates the electronic device 600, and the first button 41 and the second button 43 output by the electronic device 600. In a case in which the control device 1 sets the detection enabled region AR200 in a range larger than the electronic device 600, the operation region adjustment unit 16 of the control unit 10 expands the operation target region 44 of the second button 43 within a range inside the detection enabled region AR200.

Second Modification

For example, operability of the button output by the electronic device 600 is different between a case in which the user UR is positioned in the region in front of the electronic device 600 and a case in which the user UR is positioned outside the region in front of the electronic device 600. Specifically, a size of the operation region corresponding to the button in a case in which the user UR is positioned in the region in front of the electronic device 600 is different from a size of the operation region corresponding to the button in a case in which the user UR is positioned outside the region in front of the electronic device 600, and the operation region corresponding to the button in a case in which the user UR is positioned outside the region in front of the electronic device 600 is smaller than the operation region corresponding to the button in a case in which the user UR is positioned in the region in front of the electronic device 600.

Figure 8:
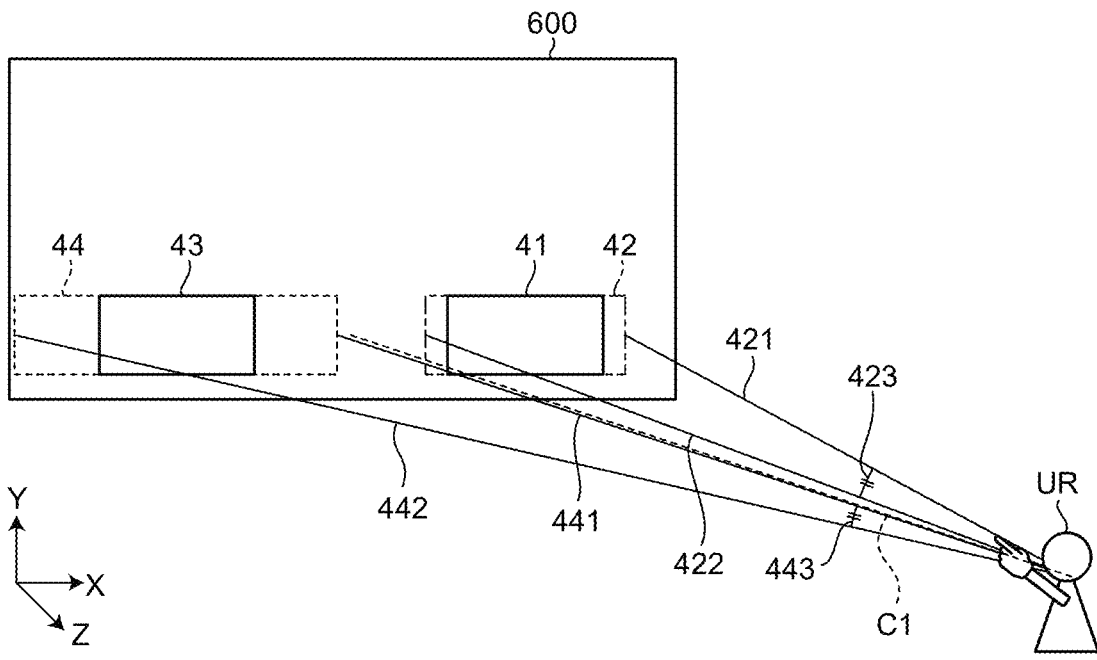
FIG. 8 is a schematic diagram for explaining an example of an operation region to be expanded according to a second modification.

Thus, the control device 1 may expand not only the operation target region of the distant button but also the operation target region of the vicinity button to the left and right in the X-axis direction to expand the operation regions of the distant button and the vicinity button. The following describes the operation region to be expanded according to a second modification with reference to FIG. 8. FIG. 8 is a schematic diagram for explaining an example of the operation region to be expanded according to the second modification.

FIG. 8 illustrates the electronic device 600, the user UR who operates the electronic device 600, and the first button 41 and the second button 43 output by the electronic device 600. The first button 41 is assumed to be the vicinity button, and the second button 43 is assumed to be the distant button. In a case in which the second determination unit 15 of the control device 1 determines that the position of the user UR is outside the region in front of the electronic device 600, the operation region adjustment unit 16 expands the operation region generated by the operation region generation unit 14.

For example, as illustrated in FIG. 8, the operation region adjustment unit 16 expands the operation target region of the first button 41 so that the right end part and the left end part of the first button 41 are extended from the center part of the first button 41, and sets an operation target region 42 of the first button 41. The operation region adjustment unit 16 also expands the operation target region of the second button 43 so that the right end part and the left end part of the second button 43 are extended from the center part of the second button 43, and sets the operation target region 44 of the second button 43.

The operation region adjustment unit 16 then sets, for the operation region corresponding to the expanded operation target region 42, a first operation angle 423 indicating an angle formed by a first straight line 421 connecting the position of the operator and the right end part of the operation target region 42 in the direction of the center line C1, and a second straight line 422 connecting the position of the operator and the left end part of the operation target region 42 in the direction of the center line C1. The operation region adjustment unit 16 also sets, for the operation region corresponding to the expanded operation target region 44, the second operation angle 443 to be equal to the first operation angle 423, the second operation angle 443 indicating the angle formed by the third straight line 441 connecting the position of the operator and the right end part of the operation target region 44 in the direction of the center line C1, and the fourth straight line 442 connecting the position of the operator and the left end part of the operation target region 44 in the direction of the center line C1.

Due to this, the operation region adjustment unit 16 can increase the first operation angle 413 to be the first operation angle 423, and cause the first operation angle 423 to be equal to the second operation angle 443. The operation region adjustment unit 16 then sets operation regions respectively corresponding to the first operation angle 423 and the second operation angle 443.

Third Modification

For example, in a case in which the control device 1 expands the operation regions, the operation target regions may overlap each other as illustrated in FIG. 9. FIG. 9 is a schematic diagram for explaining the operation target region to be expanded according to a third modification. FIG. 9 illustrates the electronic device 600, the first button 41, the second button 43, and a third button 45 output by the electronic device 600, the expanded operation target region 42 corresponding to the first button 41, the expanded operation target region 44 corresponding to the second button 43, and an expanded operation target region 46 corresponding to the third button 45.

For example, in a case of adjusting each operation region of the operation target region 42, the operation target region 44, and the operation target region 46, the operation region adjustment unit 16 may erroneously detect action of the user UR, so that it may be difficult to adjust the operation regions. Thus, in a case in which the operation target regions are expanded and the expanded operation target regions overlap each other, the control device 1 according to the third modification may expand the operation target regions not to overlap each other in accordance with configurations of the buttons output by the electronic device 600.

FIG. 10 is a schematic diagram for explaining the operation target region to be expanded according to the third modification. FIG. 10 illustrates the electronic device 600, the user UR who operates the electronic device 600, the first button 41, the second button 43, and the third button 45 output by the electronic device 600, the expanded operation target region 42 corresponding to the first button 41, the expanded operation target region 44 corresponding to the second button 43, and the expanded operation target region 46 corresponding to the third button 45. Assuming that the position of the user UR is the base point, the respective buttons are positioned to be closer to the user UR in order of the first button 41, the third button 45, and the second button 43.

In a case in which the user UR is positioned outside the region in front of the electronic device 600, the operation region adjustment unit 16 expands the operation target regions of the first button 41, the second button 43, and the third button 45 so that the operation target region 42, the operation target region 44, and the operation target region 46 do not overlap each other. In this case, operation angles of the respective buttons are not the same, but the operation target regions of the first button 41, the second button 43, and the third button 45 are widened as compared with the operation target regions before being expanded, so that operability for the user UR can be improved.

Fourth Modification

In the embodiment described above, described is a case in which the sizes of the buttons output by the electronic device 600 are equal to each other, but the embodiment is not limited thereto. A fourth modification describes a case in which the sizes of the buttons output by the electronic device 600 are different from each other with reference to FIG. 11.

Figure 11:
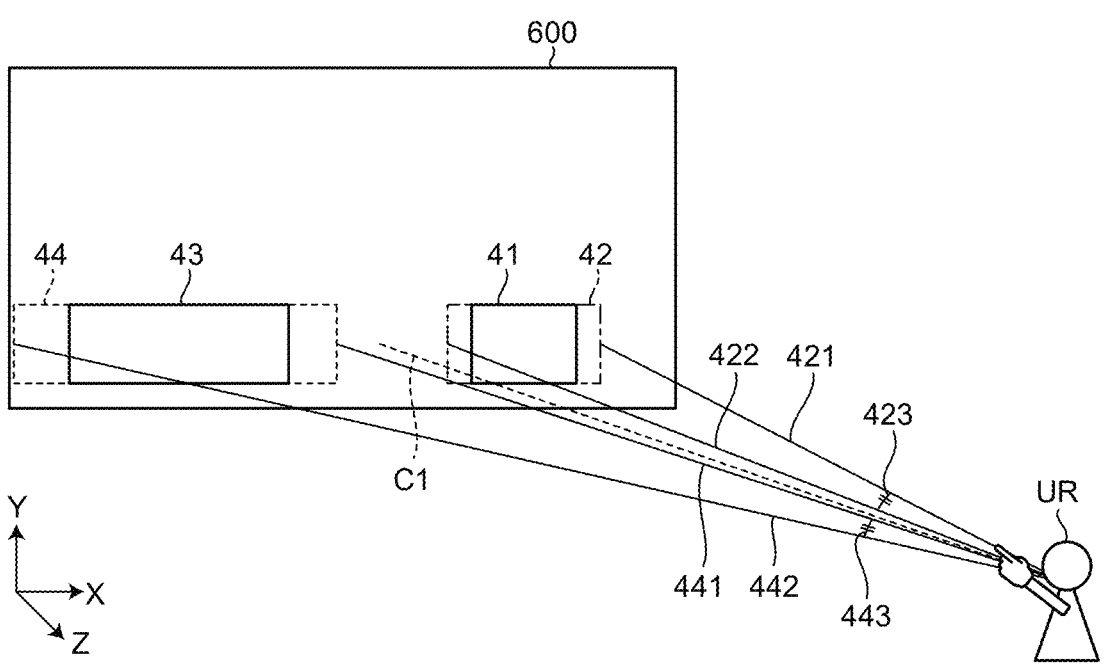
FIG. 11 is a schematic diagram for explaining an example of an operation region to be expanded according to a fourth modification.

FIG. 11 is a schematic diagram for explaining an example of the operation region to be expanded according to the fourth modification. FIG. 11 illustrates the electronic device 600, the user UR who operates the electronic device 600, and the first button 41 and the second button 43 output by the electronic device 600. The first button 41 is assumed to be the vicinity button, and the second button 43 is assumed to be the distant button. Additionally, the first button 41 is smaller than the second button 43, and they are positioned in substantially parallel with each other. In a case in which the second determination unit 15 of the control device 1 determines that the position of the user UR is outside the region in front of the electronic device 600, the operation region adjustment unit 16 expands the operation region generated by the operation region generation unit 14.

For example, as illustrated in FIG. 11, the operation region adjustment unit 16 expands the operation target region of the first button 41 so that the right end part and the left end part of the first button 41 are extended from the center part of the first button 41, and sets the operation target region 42 of the first button 41. The operation region adjustment unit 16 also expands the operation target region of the second button 43 so that the right end part and the left end part of the second button 43 are extended from the center part of the second button 43, and sets the operation target region 44 of the second button 43. At this point, the operation region adjustment unit 16 sets the operation target region 42 and the operation target region 44 not to overlap each other.

The operation region adjustment unit 16 then sets, for the operation region corresponding to the expanded operation target region 42, the first operation angle 423 indicating an angle formed by the first straight line 421 connecting the position of the operator and the right end part of the operation target region 42 in the direction of the center line C1, and the second straight line 422 connecting the position of the operator and the left end part of the operation target region 42 in the direction of the center line C1. The operation region adjustment unit 16 also sets, for the operation region corresponding to the expanded operation target region 44, the second operation angle 443 to be equal to the first operation angle 423, the second operation angle 443 indicating the angle formed by the third straight line 441 connecting the position of the operator and the right end part of the operation target region 44 in the direction of the center line C1, and the fourth straight line 442 connecting the position of the operator and the left end part of the operation target region 44 in the direction of the center line C1.

Due to this, the operation region adjustment unit 16 can increase the first operation angle 413 to be the first operation angle 423, and cause the first operation angle 423 to be equal to the second operation angle 443. The operation region adjustment unit 16 then sets operation regions respectively corresponding to the first operation angle 423 and the second operation angle 443.

Fifth Modification

In the embodiment described above, described is a case in which the buttons output by the electronic device 600 are positioned in substantially parallel with each other, but the embodiment is not limited thereto. A fifth modification describes a case in which the buttons output by the electronic device 600 are positioned in a substantially vertical direction with reference to FIG. 12.

Figure 12:
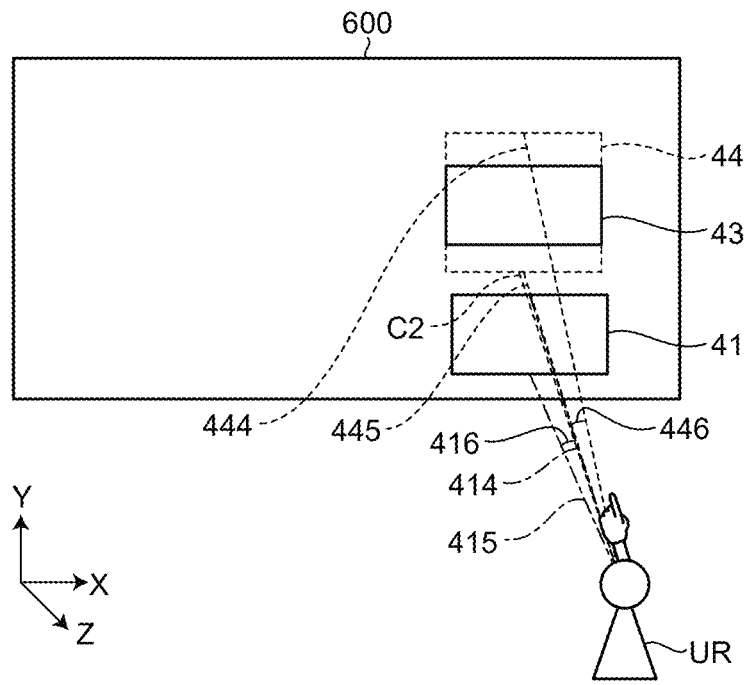
FIG. 12 is a schematic diagram for explaining an example of an operation region to be expanded according to a fifth modification.

FIG. 12 is a schematic diagram for explaining an example of the operation region to be expanded according to the fifth modification. FIG. 12 illustrates the electronic device 600, the user UR who operates the electronic device 600, and the first button 41 and the second button 43 output by the electronic device 600. The first button 41 and the second button 43 have the same size, and are positioned in a substantially vertical direction. The first button 41 is assumed to be the vicinity button, and the second button 43 is assumed to be the distant button. In a case in which the second determination unit 15 of the control device 1 determines that the position of the user UR is outside the region in front of the electronic device 600, the operation region adjustment unit 16 expands the operation region generated by the operation region generation unit 14.

In a case of FIG. 12, the operation region generation unit 14 generates an operation region corresponding to the vicinity button region of the first button 41 based on a third operation angle 416 indicating an angle formed by a fifth straight line 414 connecting an upper end part of the first button 41 and the position of the operator in a direction of a center line C2 connecting the center of the vicinity button region of the first button 41 and the center of the distant button region of the second button 43, and a sixth straight line 415 connecting a lower end part of the first button 41 and the position of the operator in the direction of the center line C2.

In a case of adjusting a fourth operation angle 446 to be equal to the third operation angle 416, the operation region adjustment unit 16 expands the operation target region of the second button 43 so that an upper end part and a lower end part of the second button 43 are extended from the center part of the second button 43, and sets the operation target region 44 of the second button 43. The operation region adjustment unit 16 sets magnitude of the angle so that, in the operation region corresponding to the expanded operation target region 44, the third operation angle 416 is equal to the fourth operation angle 446 indicating an angle formed by a seventh straight line 444 connecting the position of the operator and an upper end part of the operation target region 44 in the direction of the center line C2, and an eighth straight line 445 connecting the position of the operator and a lower end part of the operation target region 44 in the direction of the center line C2.

Due to this, the operation region adjustment unit 16 can cause the fourth operation angle 446 to be equal to the third operation angle 416. The operation region adjustment unit 16 then sets an operation region corresponding to the fourth operation angle 446.

Sixth Modification

Figure 13:
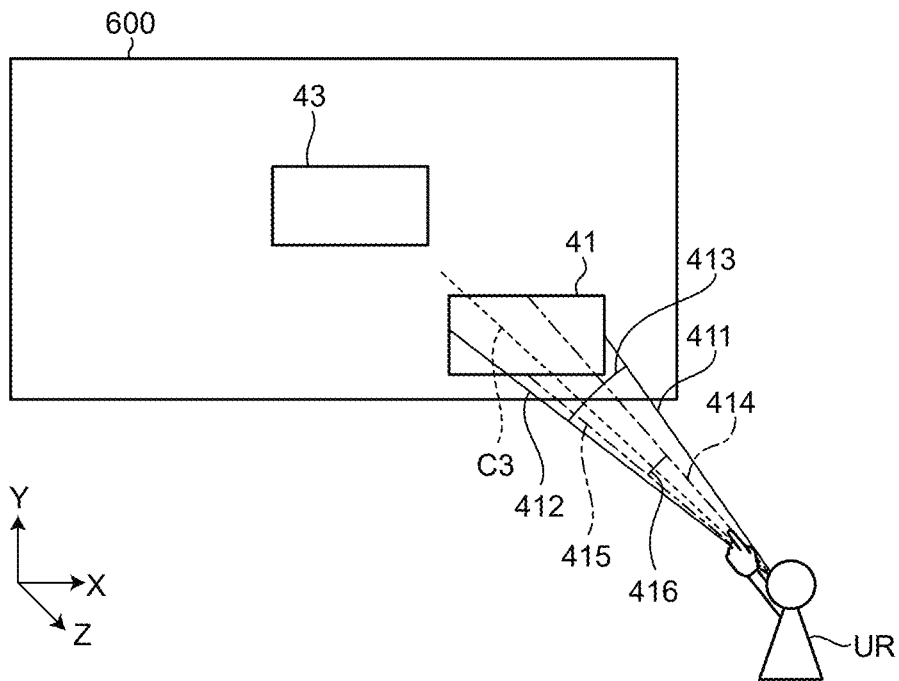
FIG. 13 is a schematic diagram for explaining an example of an operation region to be expanded according to a sixth modification.
Figure 14:
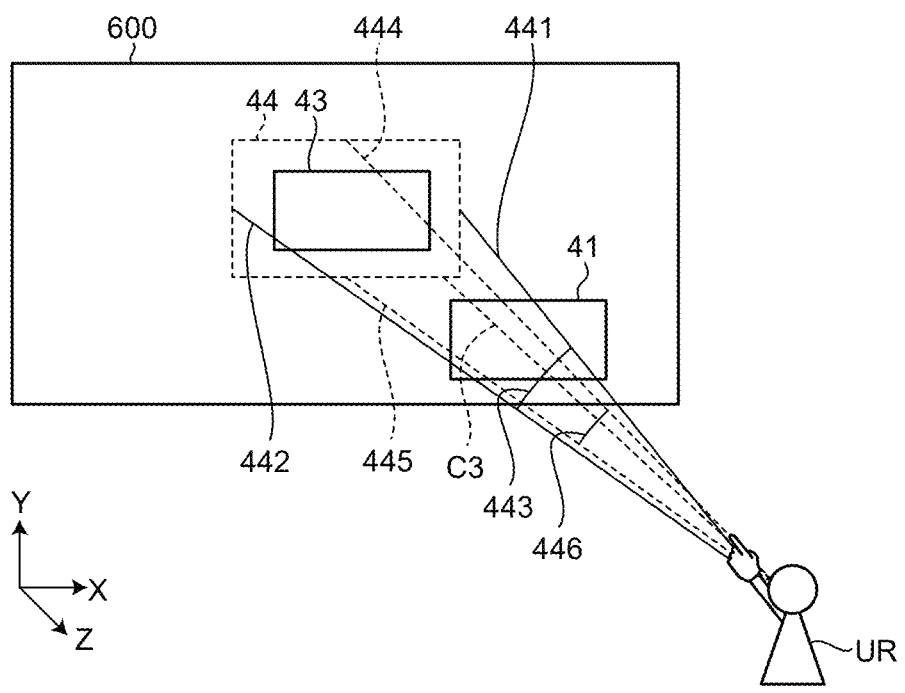
FIG. 14 is a schematic diagram for explaining an example of an operation region to be expanded according to the sixth modification.

A sixth modification describes a case in which the buttons output by the electronic device 600 are substantially diagonally positioned with reference to FIG. 13. FIG. 13 and FIG. 14 are schematic diagrams for explaining an example of the operation region to be expanded according to the sixth modification.

FIGS. 13 and 14 illustrate the electronic device 600, the user UR who operates the electronic device 600, and the first button 41 and the second button 43 output by the electronic device 600. The first button 41 and the second button 43 have the same size, and are substantially diagonally positioned. In FIG. 13, the second button 43 is positioned on upper left of the first button 41. The first button 41 is assumed to be the vicinity button, and the second button 43 is assumed to be the distant button. In a case in which the second determination unit 15 of the control device 1 determines that the position of the user UR is outside the region in front of the electronic device 600, the operation region adjustment unit 16 expands the operation region generated by the operation region generation unit 14.

In a case of FIG. 13, the operation region generation unit 14 sets, in the operation region corresponding to the vicinity button region of the first button 41, the first operation angle 413 indicating an angle formed by the first straight line 411 connecting the right end part of the first button 41 and the position of the operator in a direction of a center line C3 connecting the center of the vicinity button region of the first button 41 and the center of the distant button region of the second button 43, and the second straight line 412 connecting the left end part of the first button 41 and the position of the operator in the direction of the center line C3. The operation region generation unit 14 also sets, in the operation region corresponding to the vicinity button region of the first button 41, the third operation angle 416 indicating an angle formed by the fifth straight line 414 connecting the upper end part of the first button 41 and the position of the operator in the direction of the center line C3, and the sixth straight line 415 connecting the lower end part of the first button 41 and the position of the operator in the direction of the center line C3.

In FIG. 14, in a case of adjusting the second operation angle 443 of the second button 43 to be equal to the first operation angle 413, the operation region adjustment unit 16 expands the operation target region of the second button 43 so that the right end part and the left end part of the second button 43 are extended from the center part of the second button 43, and sets the operation target region 44 of the second button 43. The operation region adjustment unit 16 sets magnitude of the angle so that, in the operation region corresponding to the expanded operation target region 44, the first operation angle 413 is equal to the second operation angle 443 indicating the angle formed by the third straight line 441 connecting the position of the operator and the right end part of the operation target region 44 in the direction of the center line C3, and the fourth straight line 442 connecting the position of the operator and the left end part of the operation target region 44 in the direction of the center line C3.

Furthermore, in a case of adjusting the fourth operation angle 446 of the second button 43 to be equal to the third operation angle 416, the operation region adjustment unit 16 further expands the operation target region of the second button 43 so that the upper end part and the lower end part of the second button 43 are extended from the center part of the second button 43, and sets the operation target region 44 of the second button 43. The operation region adjustment unit 16 sets magnitude of the angle so that, in the operation region corresponding to the further expanded operation target region 44, the third operation angle 416 is equal to the fourth operation angle 446 indicating the angle formed by the seventh straight line 444 connecting the position of the operator and the upper end part of the operation target region 44 in the direction of the center line C3, and the eighth straight line 445 connecting the position of the operator and the lower end part of the operation target region 44 in the direction of the center line C3.

Due to this, the operation region adjustment unit 16 can cause the second operation angle 443 to be equal to the first operation angle 413. The operation region adjustment unit 16 can also cause the fourth operation angle 446 to be equal to the third operation angle 416. The operation region adjustment unit 16 then sets operation regions corresponding to the second operation angle 443 and the fourth operation angle 446.

Seventh Modification

Figure 15:
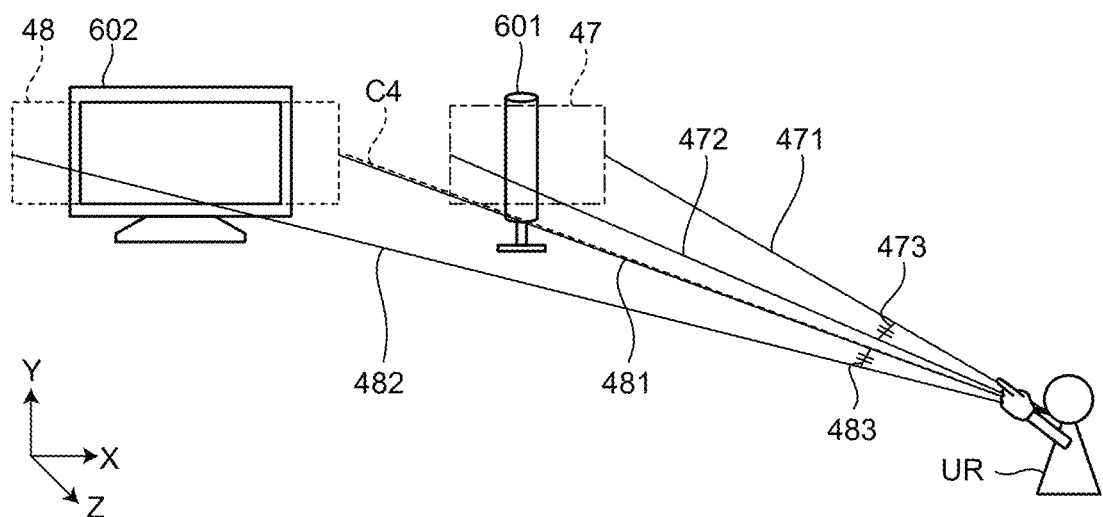
FIG. 15 is a schematic diagram for explaining operation processing of an information processing device according to a seventh modification.

In the embodiment described above, described is a form in which there is one electronic device 600, but the embodiment is not limited thereto. A seventh modification describes a form in which there are two electronic devices with reference to FIG. 15. FIG. 15 is a schematic diagram for explaining operation processing of the information processing device according to the seventh modification.

FIG. 15 illustrates a first electronic device 601, a second electronic device 602, and the user UR who operates the first electronic device 601 and the second electronic device 602. The first electronic device 601 is assumed to be a lighting fixture, and the second electronic device 602 is assumed to be a display.

For the control device 1 according to the seventh modification, there are electronic devices including the first electronic device 601 and the second electronic device 602, and the operation region adjustment unit 16 expands an operation region of at least one of the first electronic device 601 and the second electronic device 602 in a case in which the position of the operator detected by the position detection unit 13 is outside a front region corresponding to the front of the first electronic device 601 and the second electronic device 602.

For example, as illustrated in FIG. 15, the operation region generation unit 14 generates operation regions indicating regions that are defined by connecting the position of the user UR detected by the position detection unit 13 and operation target regions set on the electronic devices based on the taken image obtained by imaging the user UR. In FIG. 15, the operation target regions include a first electronic device region 47 indicating a region of the first electronic device 601 arranged closer to the user UR, and a second electronic device region 48 indicating a region of the second electronic device 602 arranged farther from the user UR.

In a case in which the position of the user UR is outside the front region corresponding to the front of the first electronic device 601 and the second electronic device 602, the operation region adjustment unit 16 sets operation regions respectively corresponding to the first electronic device region 47 and the second electronic device region 48 so that a first operation angle 473 is equal to a second operation angle 483.

The first operation angle 473 is an angle formed by a first straight line 471 connecting the position of the operator and a right end part of the operation region corresponding to the first electronic device region 47 in a direction of a center line C4 connecting the center of the first electronic device region 47 and the center of the second electronic device region 48, and a second straight line 472 connecting the position of the operator and a left end part of the operation region corresponding to the first electronic device region 47 in the direction of the center line C4. The second operation angle 483 is an angle formed by a third straight line 481 connecting a right end part of the operation region corresponding to the second electronic device region 48 in the direction of the center line C4, and a fourth straight line 482 connecting the position of the operator and a left end part of the operation region corresponding to the second electronic device region 48 in the direction of the center line C4.

Second Embodiment

The above embodiment describes a form in which the predetermined action indicates a state in which the fingertip 72 of the user UR is present in the operation region and touching the operation region, but the embodiment is not limited thereto. A second embodiment describes a form in which the predetermined action relates to a scroll operation.

Figure 16:
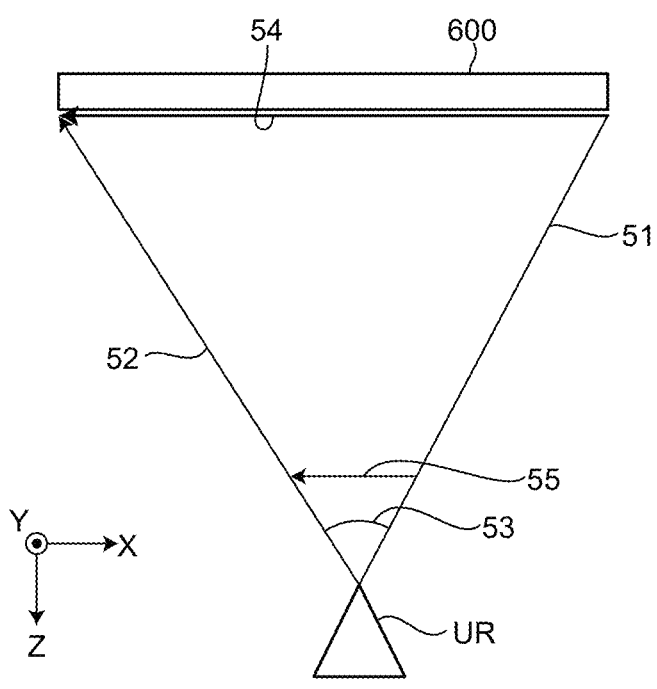
FIG. 16 is a schematic diagram for explaining operation processing of an information processing device according to a second comparative example.

FIG. 16 is a schematic diagram for explaining operation processing of the information processing device according to a second comparative example. FIG. 16 illustrates the electronic device 600, and the user UR who operates the electronic device 600. It is assumed that the user UR is positioned in front of the electronic device 600, and a distance between the user UR and the electronic device 600 is the shortest distance. The electronic device 600 is assumed to be positioned vertically in the Y-axis direction.

The following describes the operation processing of the information processing device in a case in which the user UR performs a scroll operation on the electronic device 600. Regarding the operation angle between the user UR and the electronic device 600, for example, assuming that the user UR is the base point, a first operation angle 53 is generated based on a first straight line 51 connecting the user UR with the right end part of the electronic device 600 and a second straight line 52 connecting the user UR with the left end part of the electronic device 600. An operation target movement distance 54 of the operation target region in which the user UR performs a scroll operation on the electronic device 600 corresponds to an operation movement distance 55 in the operation region in which the fingertip of the user UR performs a scroll operation.

In a case in which the user UR performs a scroll operation on the electronic device 600, the user UR and the electronic device 600 are positioned in parallel in the X-axis direction, and the distance in the Z-axis direction is the same, so that the operation target movement distance 54 is proportional to a moving speed of the scroll operation with the operation movement distance 55. Thus, with the positional relation between the user UR and the electronic device 600 illustrated in FIG. 16, the user UR can operate the electronic device 600 without a sense of incongruity.

Figure 17:
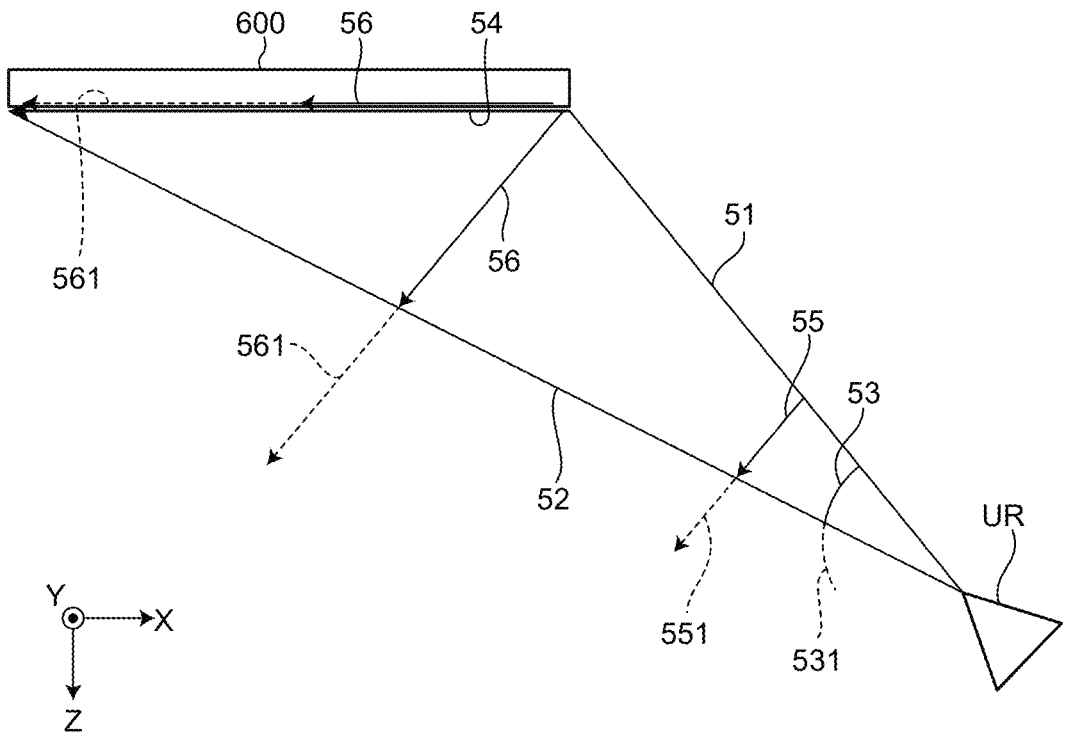
FIG. 17 is a schematic diagram for explaining operation processing of an information processing device according to a second embodiment.

FIG. 17 is a schematic diagram for explaining operation processing of the information processing device according to the second embodiment. Similarly to FIG. 16, FIG. 17 illustrates the electronic device 600, and the user UR who operates the electronic device 600. Regarding the operation angle between the user UR and the electronic device 600, for example, assuming that the user UR is the base point, the first operation angle 53 is generated based on the first straight line 51 connecting the user UR with the right end part of the electronic device 600 and the second straight line 52 connecting the user UR with the left end part of the electronic device 600. The operation target movement distance 54 of the operation target region in which the user UR performs a scroll operation on the electronic device 600 corresponds to the operation movement distance 55 in the operation region in which the fingertip of the user UR performs a scroll operation.

In a case in which the user UR is positioned outside the region in front of the electronic device 600, for example, in a case in which the user UR is positioned on the right of the region in front of the electronic device 600 as illustrated in FIG. 17, the positional relation between the user UR and the electronic device 600 is not parallel. In a case in which the user UR is positioned on the right of the region in front of the electronic device 600, the first straight line 51 is shorter than the second straight line 52.

In a case of performing scroll operation from a right end to a left end of the electronic device 600, the user UR may feel that the moving speed becomes higher as the scroll operation advances toward the left end. This is because the operation target movement distance 54 corresponding to the operation movement distance 55 is different from an operation target movement distance 56 in a case in which the user UR and the electronic device 600 are positioned in parallel in the X-axis direction and the distance in the Z-axis direction is the same. For example, in FIG. 17, in a case of applying the operation target movement distance 56 to a position parallel with the operation movement distance 55, the operation target movement distance 56 is shorter than the operation target movement distance 54 in a case in which the user UR and the electronic device 600 are parallel with each other.

Thus, in a case in which the user UR is positioned on the right of the region in front of the electronic device 600, the operation target movement distance 54 is not proportional to the moving speed of the scroll operation of the operation movement distance 55, so that the user UR may feel that the moving speed is high as the scroll operation advances toward the left end in a case of performing the scroll operation from the right end toward the left end of the electronic device 600, and the user UR may feel that it is difficult to perform the scroll operation due to a change of the positional relation with the electronic device 600.

Thus, the second embodiment provides the information processing device that can improve operability for the user UR in a case in which the user UR is positioned outside the region in front of the electronic device 600 when the user UR performs the scroll operation.

Specifically, the information processing device according to the second embodiment determines a size of the expanded operation region based on the positional relation between the electronic device 600 and the operator. For example, in a case in which the electronic device 600 is a display, the information processing device according to the second embodiment determines the size of the expanded operation region based on the size of the operation region in a case in which the display is disposed in front of the operator while the shortest distance between the display and the operator is kept equal.

Figure 18:
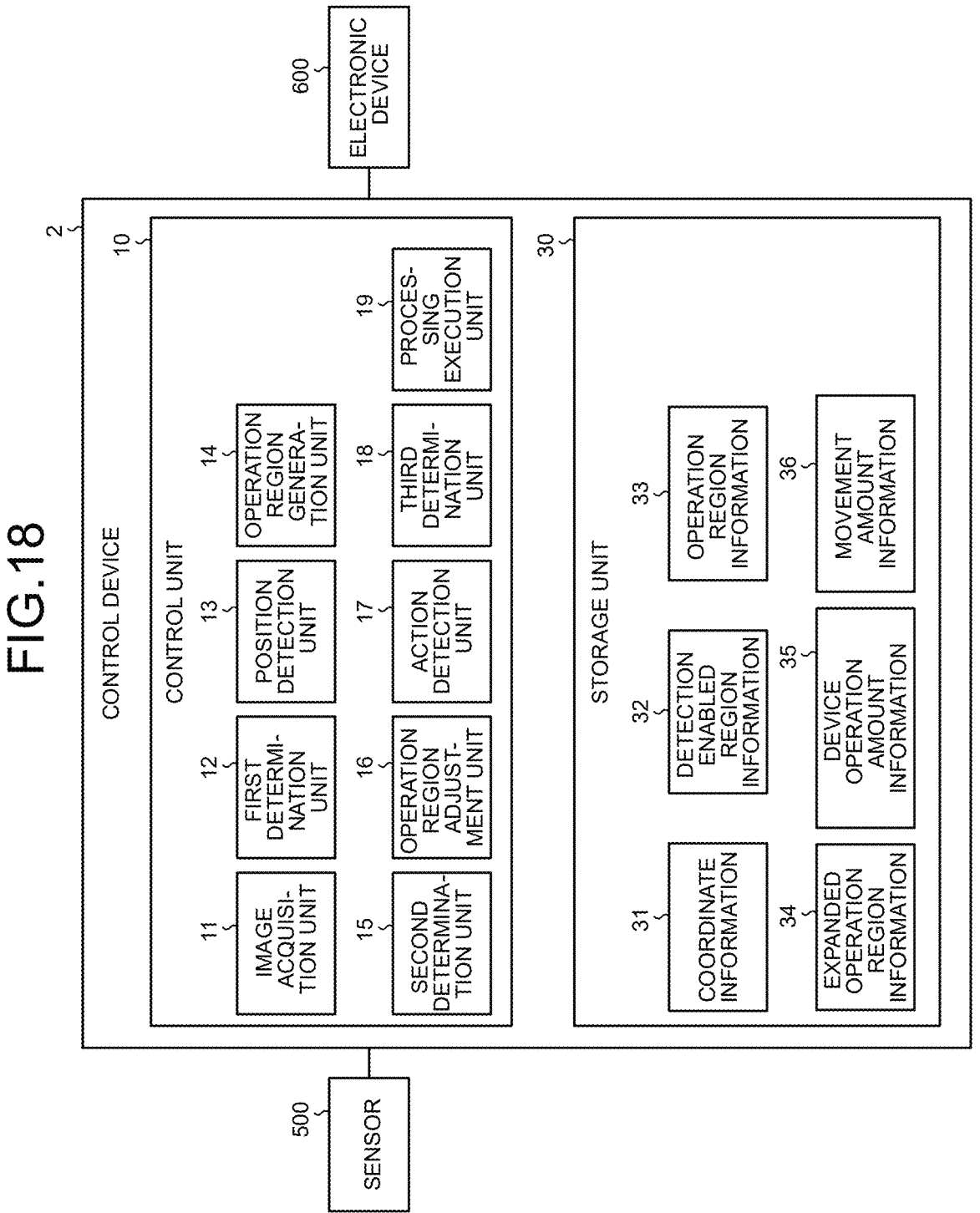
FIG. 18 is a diagram illustrating a schematic configuration of an information system including a control device as the information processing device according to the second embodiment.

FIG. 18 is a diagram illustrating a schematic configuration of the information system including a control device 2 as the information processing device according to the second embodiment. The information processing device according to the second embodiment includes the sensor 500, the electronic device 600, and the control device 2. In FIG. 18, the same points as those of the control device 1 according to the first embodiment illustrated in FIG. 4 will not be described in detail.

The control device 2 includes the control unit 10 and the storage unit 30. The control unit 10 is configured as a CPU, for example, and integrally controls operation of parts of the control device 2. The control device 2 according to the present embodiment includes a ROM and a RAM (not illustrated). The ROM stores various computer programs. The RAM is a working area for the CPU at the time of executing a computer program.

By executing the computer programs stored in the ROM using the RAM as a working area, the CPU implements the image acquisition unit 11, the first determination unit 12, the position detection unit 13, the operation region generation unit 14, the second determination unit 15, the operation region adjustment unit 16, the action detection unit 17, the third determination unit 18, and the processing execution unit 19 as illustrated in FIG. 18.

The storage unit 30 stores the coordinate information 31, the detection enabled region information 32, the operation region information 33, the expanded operation region information 34, the device operation amount information 35, and movement amount information 36. The movement amount information 36 is information indicating a movement amount of the fingertip 72 of the user UR that has moved. The device operation amount information 35 is information indicating operation of the electronic device 600 corresponding to the movement amount of the fingertip 72 of the user UR that has moved. The operation of the electronic device 600 includes, for example, a scroll operation on the electronic device 600.

The operation region generation unit 14 generates an operation region indicating a region that is defined by connecting the position of the user UR detected by the position detection unit 13 and an operation target region set on the electronic device based on the taken image obtained by imaging the user UR. For example, the operation region generation unit 14 determines a size of the expanded operation region based on the size of the operation region in a case in which the electronic device 600 is a display, and the display is disposed in front of the operator while the shortest distance between the display and the operator is kept equal. The following describes the operation region generated by the operation region generation unit 14 with reference to FIG. 17.

Herein, for example, in a case in which the electronic device 600 is a display, the operation target region is a region on the display in which the scroll operation is performed from one end part to the other end part of the display. In FIG. 17, the one end part of the display is the right end part of the electronic device 600, and the other end part of the display is the left end part of the electronic device 600.

In FIG. 17, the first operation angle 53 is an operation region indicating a region that is defined by connecting the position of the user UR and the operation target region set on the electronic device. The operation region is, for example, a region that is set based on the first operation angle 53 indicating an angle formed by the first straight line 51 connecting the right end part of the electronic device 600 and the position of the operator, and the second straight line 52 connecting the left end part of the electronic device 600 and the position of the operator.

Returning to FIG. 18, in a case in which the second determination unit 15 determines that the position of the operator detected by the position detection unit 13 is outside the region in front of the electronic device 600, the operation region adjustment unit 16 expands the operation region generated by the operation region generation unit 14. The following describes the operation region expanded by the operation region adjustment unit 16 with reference to FIG. 19.

Figure 19:
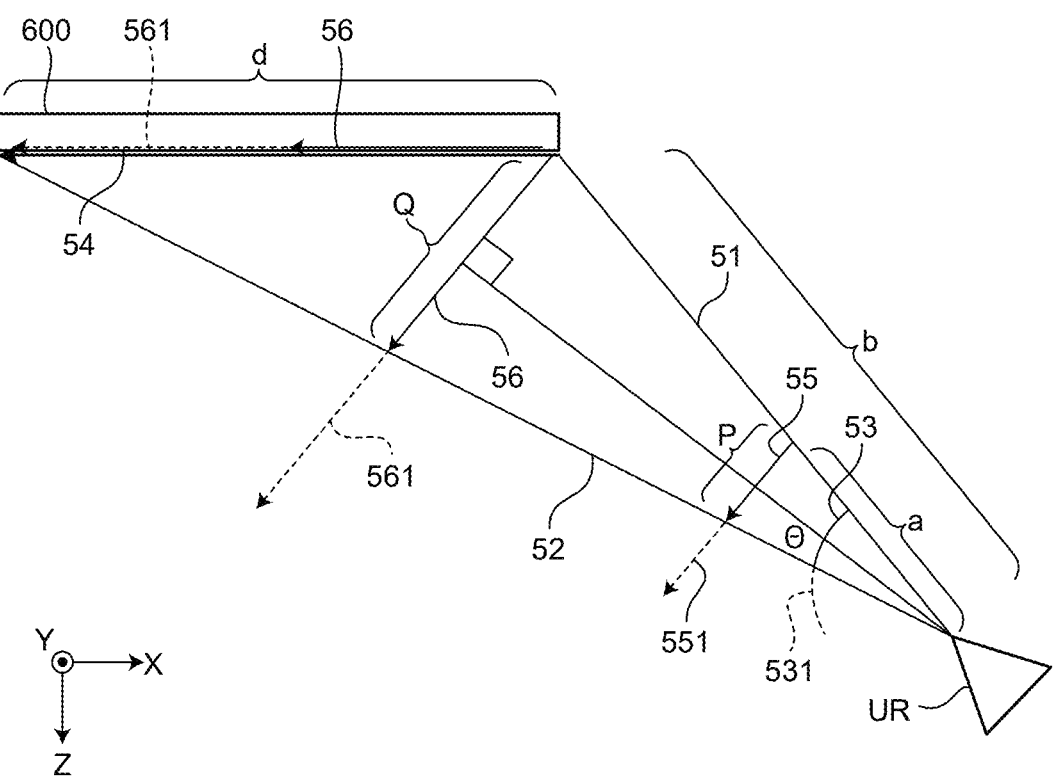
FIG. 19 is a schematic diagram for explaining an example of an operation region to be expanded according to the second embodiment.

FIG. 19 is a schematic diagram for explaining an example of the operation region to be expanded according to the second embodiment. Similarly to FIG. 17, FIG. 19 illustrates the electronic device 600, and the user UR who operates the electronic device 600. Herein, it is assumed that the operation target movement distance 54 in a case in which the user UR and the electronic device 600 are parallel with each other is d (mm), a distance from the user UR to the fingertip is a (mm), a distance of the first straight line 51 is b (mm), and an angle of the first operation angle 53 is e (degree).

In FIG. 19, a movement distance P (mm) by which the fingertip of the user UR moves can be calculated as $P = a \times \sin(\theta/2)$. In a case in which the electronic device 600 is positioned in parallel with the user UR at the distance of the first straight line 51, assuming that the operation target movement distance 56 of the electronic device 600 is Q (mm), $Q = 2b \times \sin(\theta/2)$ can be calculated.

At this point, when the scroll operation is performed with the fingertip of the user UR by the movement distance P (mm) and the scroll operation is performed by Q (mm) on the electronic device 600, the distance becomes the same as the movement distance on the electronic device 600 in a case in which the user UR is positioned in the region in front of the electronic device 600, so that a scroll speed becomes equal to that in the operation in a case in which the user UR is positioned in the region in front of the electronic device 600.

On the other hand, the user UR is positioned on the right of the region in front of the electronic device 600, so that the operation target region corresponding to d-Q (mm) remains in the operation target movement distance 54 in a case in which the user UR and the electronic device 600 are parallel with each other. Thus, to perform the scroll operation for the distance d-Q (mm) of the remaining operation target region at the same scroll speed as that in a case in which the user UR is positioned in the region in front of the electronic device 600 in a state in which the shortest distance between the electronic device 600 and the user UR is kept equal, the operation region adjustment unit 16 expands the operation target movement distance 56 by d-Q (mm) as an expanded operation target movement distance 561, and determines the size of the operation region after being expanded. As a result, the expanded operation target movement distance 561 is 2d-Q (mm).

The operation region adjustment unit 16 also expands an operation movement distance 551 corresponding to the expanded operation target movement distance 561 by a×(d/b−sin (θ/2)) (mm), and determines the size of the operation region after being expanded. As a result, the operation movement distance 551 corresponding to the expanded operation target movement distance 561 is a×(1+d/b−sin (θ/2)) (mm).

Furthermore, the operation region adjustment unit 16 expands an expanded first operation angle 531 corresponding to the expanded operation target movement distance 561 by (θ−2a*sin (d/b)−a*θ) (degree), and determines the size of the operation region after being expanded. As a result, the first operation angle 531 corresponding to the expanded operation target movement distance 561 is (2θ−2a*sin (d/b)−a*θ) (degree).

As described above, the control device 2 according to the second modification of the present disclosure determines the size of the operation region after being expanded based on the positional relation between the electronic device 600 and the operator. The control device 2 determines the size of the operation region after being expanded based on the size of the operation region in a case in which the electronic device 600 is a display, and the display is disposed in front of the operator while the shortest distance between the display and the operator is kept equal.

Due to this, for example, when the control device 2 expands the operation region in a case in which the position of the operator is outside the region in front of the electronic device 600 when the operator performs the scroll operation, the operator can perform the same scroll operation as that in a case in which the operator is positioned in the region in front of the electronic device 600. Thus, the control device 2 can improve operability for the user.

Eighth Modification

Figure 20:
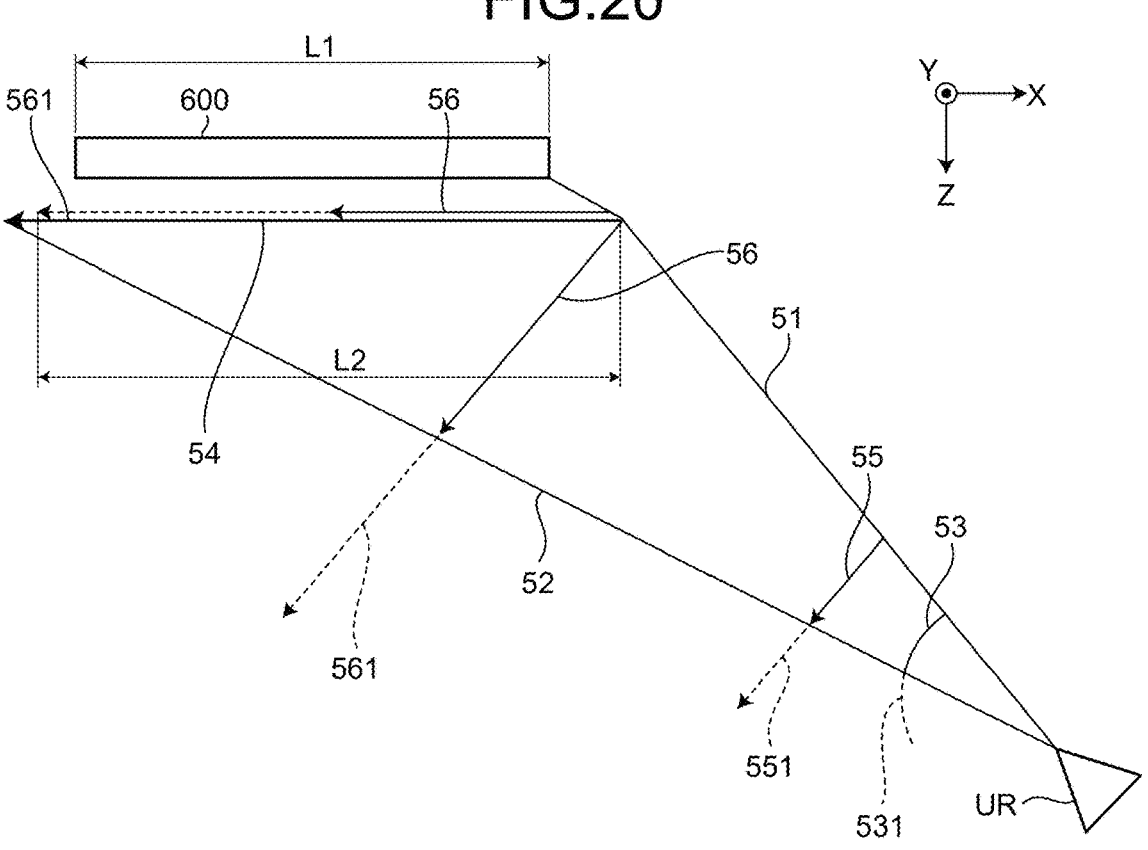
FIG. 20 is a schematic diagram for explaining an example of an operation target region to be expanded according to an eighth modification.

For example, the control device 2 may expand the operation target region of the electronic device 600 to overlap a region outside the electronic device 600 so long as the operation target region is inside the detection enabled region AR200. The following describes the operation target region to be expanded according to an eighth modification with reference to FIG. 20. FIG. 20 is a schematic diagram for explaining an example of the operation target region to be expanded according to the eighth modification.

FIG. 20 corresponds to the content illustrated in FIG. 19. It is assumed that a length of the electronic device 600 is L1 (mm) and a length of the detection enabled region AR200 of the electronic device 600 is L2 (mm), and L2>L1>0 is satisfied. In a case in which the control device 2 sets the detection enabled region AR200 in a range larger than the electronic device 600, the operation region adjustment unit 16 of the control unit 10 expands the operation target movement distance 56 within a range inside the detection enabled region AR200, and determines the size of the operation region after being expanded corresponding to the expanded operation target movement distance 561.

Ninth Modification

In the embodiment described above, described is a form in which the electronic device 600 is positioned vertically in the Y-axis direction, but the embodiment is not limited thereto. A ninth modification describes a form in which the electronic device 600 is inclined in the positive direction of the Z-axis with respect to the user UR with reference to FIG. 21.

Figure 21:
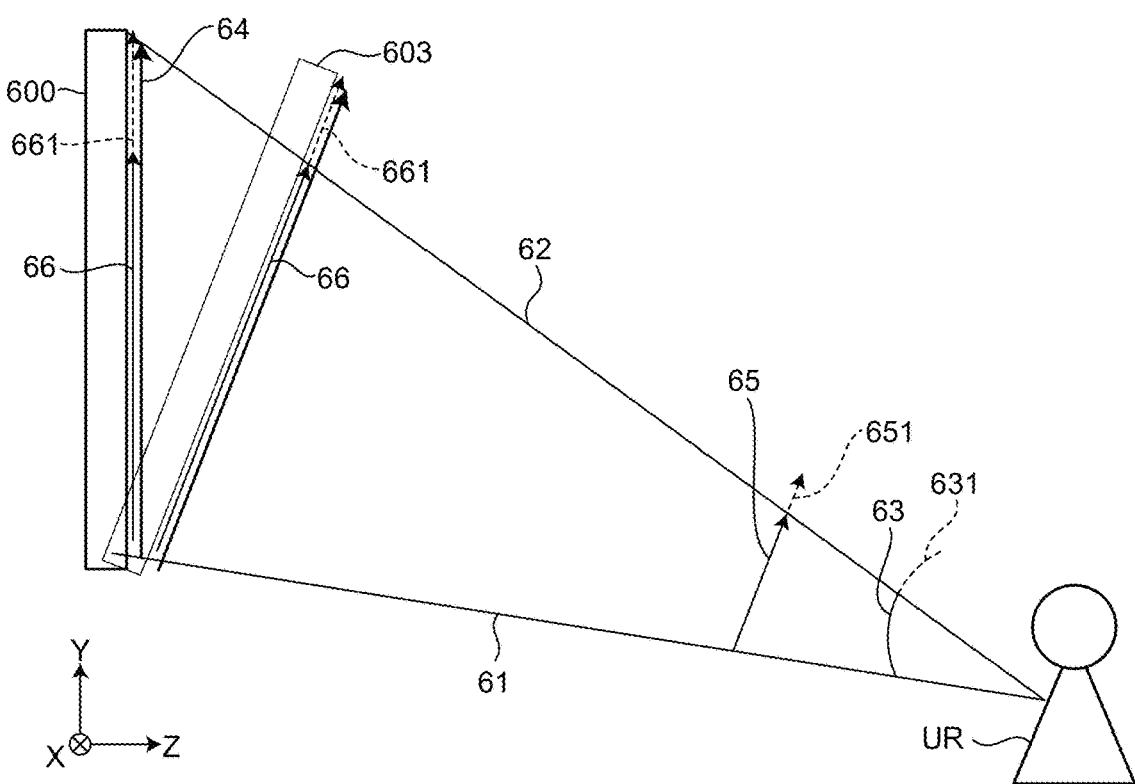
FIG. 21 is a schematic diagram for explaining an example of an operation region to be expanded according to a ninth modification.

FIG. 21 is a schematic diagram for explaining an example of the operation region to be expanded according to the ninth modification. FIG. 21 illustrates the electronic device 600, and the user UR who operates the electronic device. The electronic device 600 is positioned vertically in the Y-axis direction. An electronic device 603 is inclined in the positive direction of the Z-axis with respect to the user UR.

The operation region generation unit 14 generates an operation target movement distance 64 of the operation target region in which the user UR performs the scroll operation on the electronic device 600 that is vertically positioned based on a first operation angle 63 indicating an angle formed by a first straight line 61 connecting a lower end part of the electronic device 600 and the position of the operator and a second straight line 62 connecting an upper end part of the electronic device 600 and the position of the operator. The operation target movement distance 64 in a case of FIG. 21 is a scroll distance to scroll in the Y-axis direction.

To perform the scroll operation on the inclined electronic device 603 at the same speed as that in the case in which the user UR is positioned vertically to the electronic device 600, the operation region adjustment unit 16 determines the size of the operation region after being expanded assuming that an operation target movement distance 66 corresponding to the electronic device 603 is an expanded operation target movement distance 661. Specifically, the operation region adjustment unit 16 determines the operation target movement distance 64 and the expanded operation target movement distance 661 to be equal to each other.

The operation region adjustment unit 16 determines the size of the operation region after being expanded for an expanded operation movement distance 651 corresponding to the expanded operation target movement distance 661. Furthermore, the operation region adjustment unit 16 determines the size of the operation region after being expanded for an expanded first operation angle 631 corresponding to the expanded operation target movement distance 661.

Tenth Modification

The sensor 500 is not limited to the visible light camera, but may be a charge coupled device (CCD) camera, a complementary metal oxide semiconductor (CMOS) camera, or an RGB camera, for example. The sensor 500 is not limited to a camera device, but may be a time of flight (TOF) sensor, or an infrared sensor.

Eleventh Modification

The position detection unit 13 detects the fingertip of the user UR based on the image obtained by imaging the user as the operator, but the embodiment is not limited thereto. For example, the position detection unit 13 may detect a hand, a palm, or an arm of the user UR.

Third Embodiment

A third embodiment describes a form in which the fingertip 72 of the user UR is present in the expanded operation target region to select the expanded operation target region as the predetermined action. Specifically, in a case in which the action detection unit 17 detects an action selecting one of the operation regions, the operation region adjustment unit 16 of the control unit 10 determines the size of the operation target region after being expanded in accordance with the predetermined action.

Figure 22:
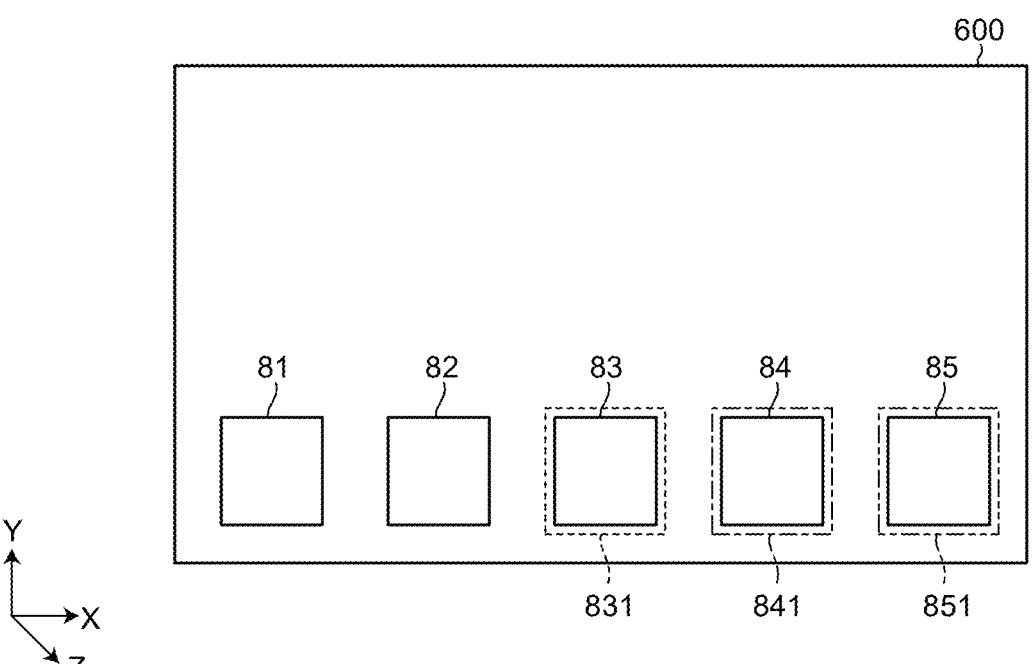
FIG. 22 is a schematic diagram for explaining an example of an expanded operation target region according to a third embodiment.

FIG. 22 is a schematic diagram for explaining an example of the expanded operation target region according to the third embodiment. FIG. 22 illustrates the electronic device 600, and a button 81, a button 82, a button 83, a button 84, and a button 85 output by the electronic device 600. FIG. 22 also illustrates an expanded operation target region 831 corresponding to the button 83, an expanded operation target region 841 corresponding to the button 84, and an expanded operation target region 851 corresponding to the button 85. Herein, in FIG. 22, sizes of the operation target region 831, an operation target region 842, and the operation target region 851 are equal to each other.

For example, in FIG. 22, the action detection unit 17 of the control unit 10 detects an action selecting the button 84 by the user UR in the operation target region expanded by the operation region adjustment unit 16 based on the taken image obtained by imaging the user UR. For example, the action detection unit 17 detects the action selecting the button 84 by the user UR in the operation target region expanded by the operation region adjustment unit 16 in which the fingertip 72 of the user UR enters a range closer to the electronic device 600 than the virtual operation region AR100. Herein, the action selecting the button 84 by the user UR includes action before the fingertip 72 of the user UR moves toward the button 84 to select the button 84.

Figure 23:
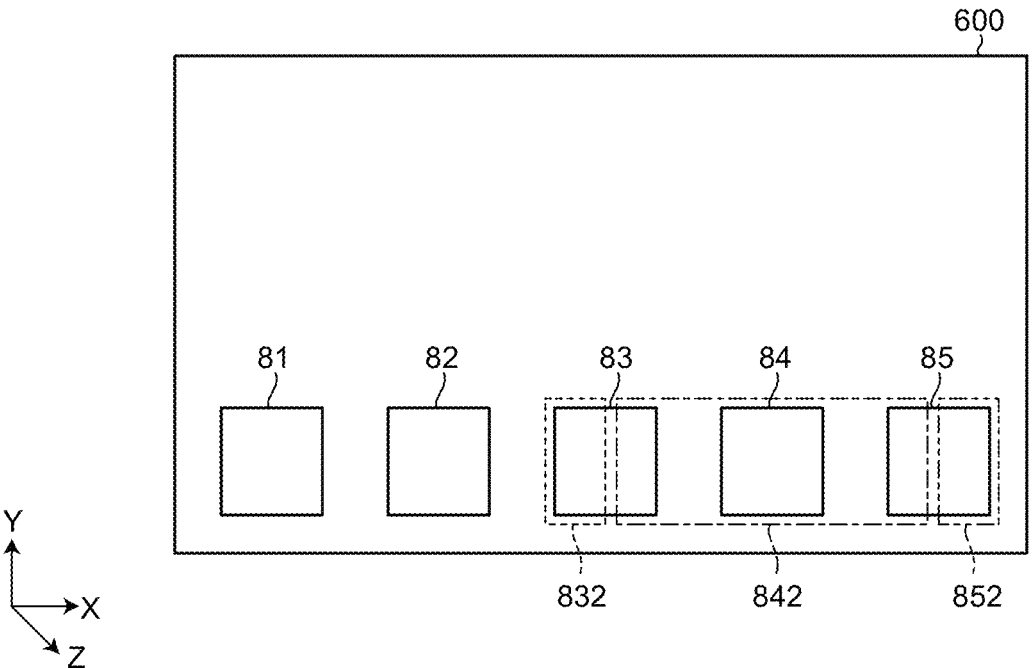
FIG. 23 is a schematic diagram for explaining an example of an expanded operation target region according to the third embodiment.

As illustrated in FIG. 23, the operation region adjustment unit 16 expands a size of the operation target region 841 corresponding to the button 84 before being selected, and reduces sizes of the operation target region 831 and the operation target region 851 adjacent to the operation target region 841.

FIG. 23 is a schematic diagram for explaining an example of the expanded operation target region according to the third embodiment. FIG. 23 is a schematic diagram of a state before the user UR illustrated in FIG. 22 selects the button 84. Similarly to FIG. 22, FIG. 23 illustrates the electronic device 600, and the button 81, the button 82, the button 83, the button 84, and the button 85 output by the electronic device 600. FIG. 23 illustrates a reduced operation target region 832 corresponding to the button 83, an expanded operation target region 842 corresponding to the button 84, and a reduced operation target region 852 corresponding to the button 85.

Herein, among the operation target regions in FIG. 23, a size of the operation target region 842 is the largest, and sizes of the operation target region 832 and the operation target region 852 adjacent to the operation target region 842 are equal to each other and are both smaller than the size of the operation target region 842. That is, in a case in which the sizes of the operation target regions after being expanded corresponding to the operation regions are equal to each other, the operation region adjustment unit 16 expands the size of the operation target region after being expanded corresponding to the operation region to be selected, and reduces the size of the operation target region after being expanded corresponding to the other operation region adjacent to the operation region to be selected.

Figure 24:
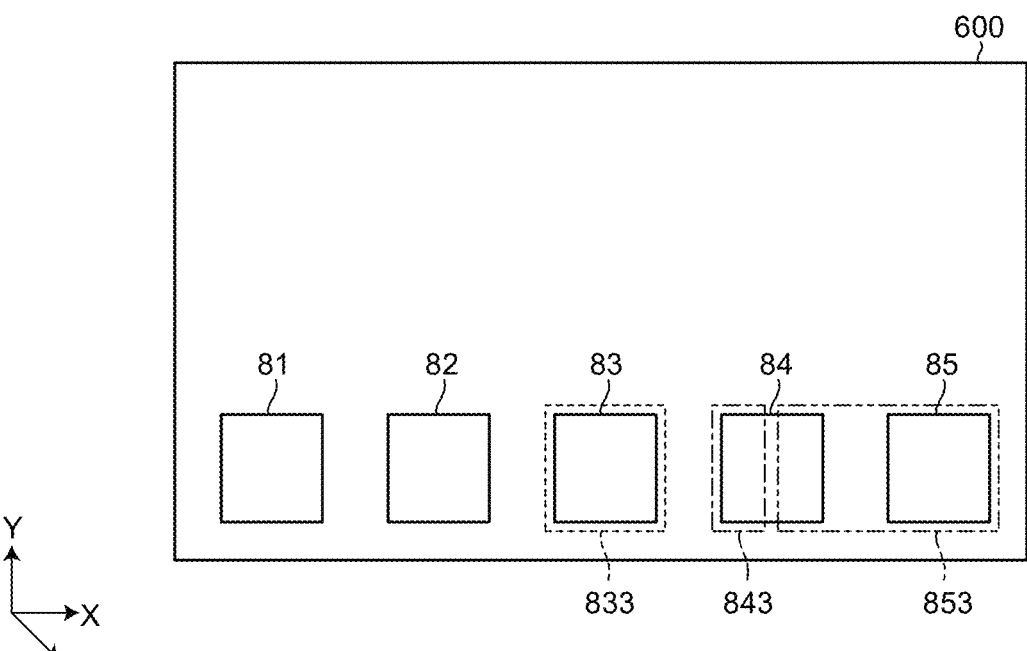
FIG. 24 is a schematic diagram for explaining an example of an expanded operation target region according to the third embodiment.

Next, the following describes a state when the user UR performs sliding action toward the positive direction of the X-axis from a state before selecting the button 84 illustrated in FIG. 23, which is a state before selecting the button 85. For example, in FIG. 23, the action detection unit 17 detects action selecting the button 85 by the user UR in the operation target region expanded by the operation region adjustment unit 16 based on the taken image obtained by imaging the user UR. As illustrated in FIG. 24, the operation region adjustment unit 16 expands the size of the operation target region 852 corresponding to the button 85 before being selected, and reduces the size of the operation target region 842 adjacent to the operation target region 852.

FIG. 24 is a schematic diagram for explaining an example of the expanded operation target region according to the third embodiment. FIG. 24 is a schematic diagram of a state in which the user UR illustrated in FIG. 23 selects the button 85. Similarly to FIG. 22 and FIG. 23, FIG. 24 illustrates the electronic device 600, and the button 81, the button 82, the button 83, the button 84, and the button 85 output by the electronic device 600. FIG. 24 illustrates an expanded operation target region 833 corresponding to the button 83, a reduced operation target region 843 corresponding to the button 84, and an expanded operation target region 853 corresponding to the button 85.

Herein, among the operation target regions in FIG. 24, a size of the operation target region 853 is the largest, a size of the operation target region 833 is smaller than the size of the operation target region 853, and a size of the operation target region 843 adjacent to the operation target region 853 is smaller than the operation target region 853. That is, the operation region adjustment unit 16 expands the size of the operation target region corresponding to the operation region before being selected, reduces the size of the other operation target region adjacent to the operation target region before being selected, and maintains the size of the other operation target region not adjacent to the operation target region before being selected.

As described above, in a case in which an action selecting one of the operation regions is detected, the control device according to the third embodiment of the present disclosure determines the size of the operation target region after being expanded in accordance with the predetermined action.

Due to this, for example, in a case in which the operator selects the operation region, the control device can determine the size of the operation target region corresponding to the operation region in accordance with the action to be selected. Thus, the control device can improve operability for the user.

Tenth Modification

Figure 25:
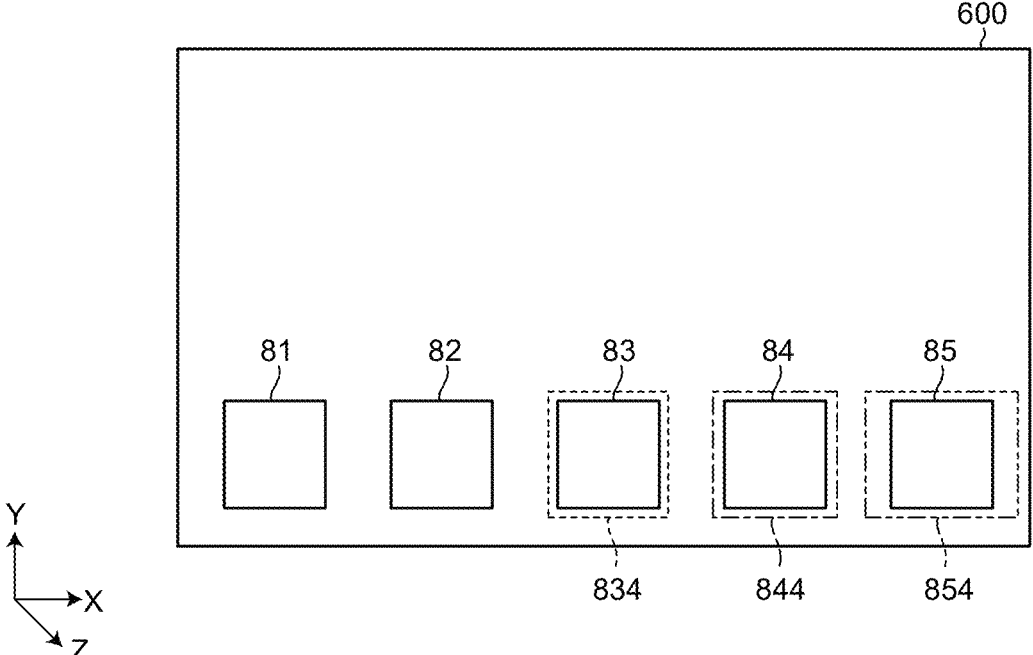
FIG. 25 is a schematic diagram for explaining an example of an expanded operation target region according to a tenth modification.

The above third embodiment describes a form of selecting the expanded operation target region in a case in which the expanded operation target regions corresponding to the buttons output by the electronic device 600 are equal to each other, but the embodiment is not limited thereto. A tenth modification describes a form of selecting the expanded operation target region in a case in which the expanded operation target regions corresponding to the buttons output by the electronic device 600 are different from each other. FIG. 25 is a schematic diagram for explaining an example of the expanded operation target region according to the tenth modification. Similarly to FIG. 22, FIG. 25 illustrates the electronic device 600, and the button 81, the button 82, the button 83, the button 84, and the button 85 output by the electronic device 600. FIG. 25 also illustrates an expanded operation target region 834 corresponding to the button 83, an expanded operation target region 844 corresponding to the button 84, and an expanded operation target region 854 corresponding to the button 85.

Herein, in FIG. 25, sizes of the operation target region 834, the operation target region 844, and the operation target region 854 are different from each other, and the sizes become larger in order of the operation target region 834, the operation target region 844, and the operation target region 854. For example, in a case in which the user UR is positioned in front of the button 83, the operation region adjustment unit 16 increases the size of the operation target region corresponding to the button output by the electronic device 600 as a distance to the center of the user UR is increased.

Figure 26:
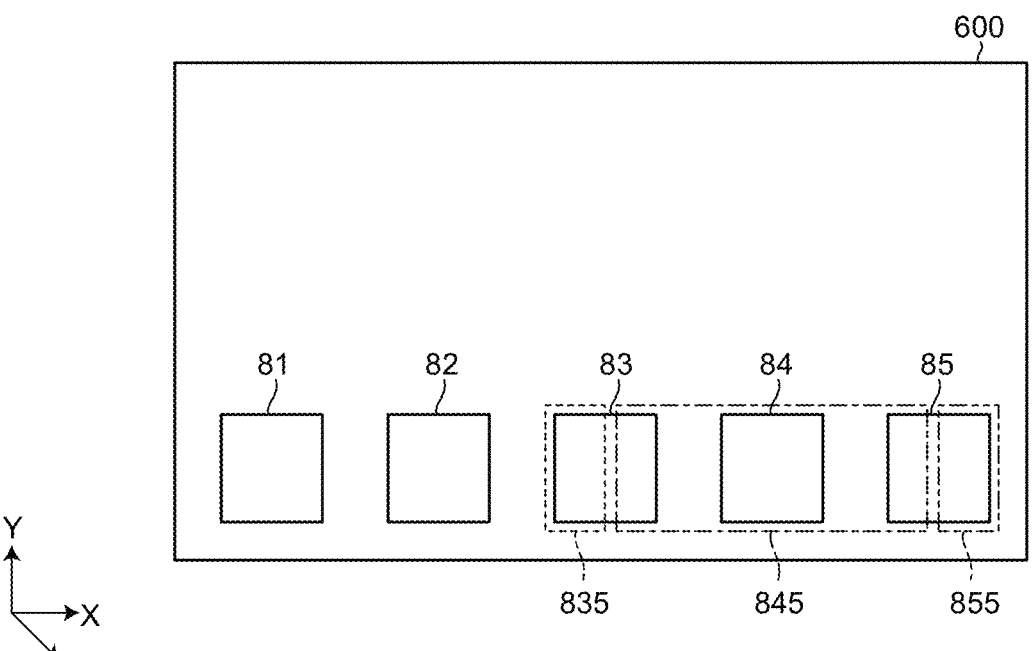
FIG. 26 is a schematic diagram for explaining an example of an expanded operation target region according to the tenth modification.

For example, in FIG. 25, the action detection unit 17 detects an action selecting the button 84 by the user UR in the operation target region expanded by the operation region adjustment unit 16 based on the taken image obtained by imaging the user UR. As illustrated in FIG. 26, the operation region adjustment unit 16 expands a size of the operation target region 844 corresponding to the button 84 before being selected, and reduces sizes of the operation target region 834 and the operation target region 854 adjacent to the operation target region 844.

FIG. 26 is a schematic diagram for explaining an example of the expanded operation target region according to the tenth modification. FIG. 26 is a schematic diagram of a state before the user UR illustrated in FIG. 25 selects the button 84. Similarly to FIG. 25, FIG. 26 illustrates the electronic device 600, and the button 81, the button 82, the button 83, the button 84, and the button 85 output by the electronic device 600. FIG. 26 illustrates a reduced operation target region 835 corresponding to the button 83, an expanded operation target region 845 corresponding to the button 84, and a reduced operation target region 855 corresponding to the button 85.

Herein, among the operation target regions in FIG. 26, a size of the operation target region 845 corresponding to the button 84 before being selected by the user UR is the largest, a size of the operation target region 855 that is adjacent to the operation target region 845 and distant from the center of the user UR is smaller, and a size of the operation target region 835 that is adjacent to the operation target region 845 and positioned in front of the user UR is further smaller. The size of the operation target region 855 and the size of the operation target region 835 are smaller than the size of the operation target region 845. That is, in a case in which the sizes of the operation target regions after being expanded corresponding to the operation regions are different from each other, the operation region adjustment unit 16 expands the size of the operation target region corresponding to the selected operation region, and reduces the sizes of the other operation target regions adjacent to the selected operation target region.

Eleventh Modification

An eleventh modification describes a form of selecting the expanded operation target region in a case in which the expanded operation target regions corresponding to the buttons output by the electronic device 600 overlap each other. Specifically, in a case in which the action detection unit 17 detects an action selecting one of the operation regions, the operation region adjustment unit 16 moves the expanded operation target region.

Figure 27:
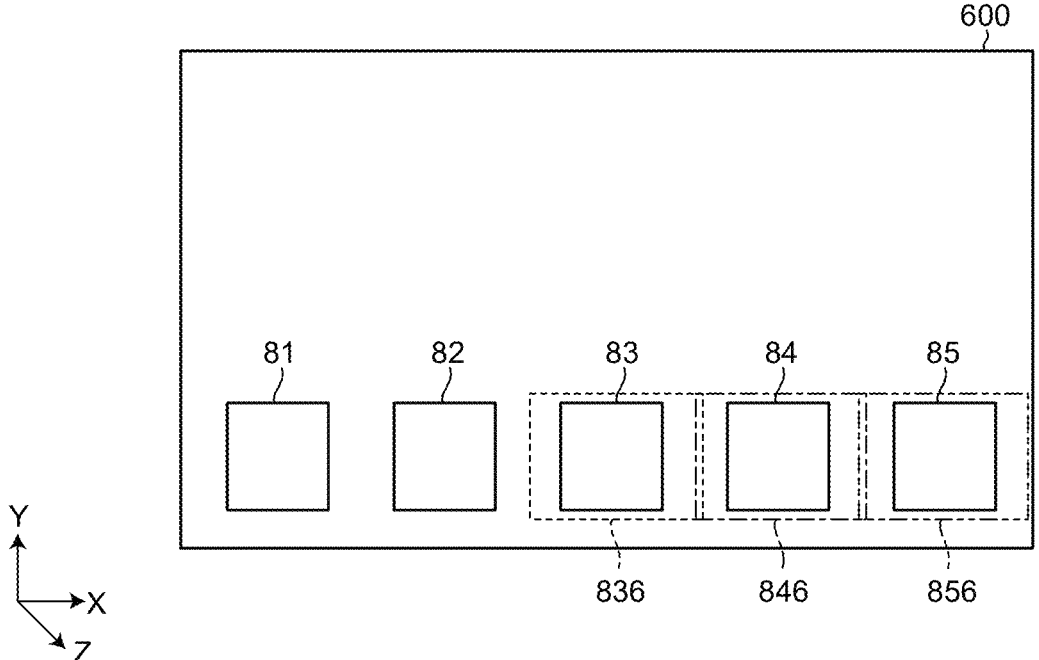
FIG. 27 is a schematic diagram for explaining an example of an expanded operation target region according to an eleventh modification.

FIG. 27 is a schematic diagram for explaining an example of the expanded operation target region according to the eleventh modification. Similarly to FIG. 22, FIG. 27 illustrates the electronic device 600, and the button 81, the button 82, the button 83, the button 84, and the button 85 output by the electronic device 600. FIG. 27 also illustrates an expanded operation target region 836 corresponding to the button 83, an expanded operation target region 846 corresponding to the button 84, and an expanded operation target region 856 corresponding to the button 85.

Herein, in FIG. 27, sizes of the operation target region 836, the operation target region 846, and the operation target region 856 are equal to each other while the right of the operation target region 836 overlaps the left of the operation target region 846, and the right of the operation target region 846 overlaps the left of the operation target region 856. The sizes of the operation target region 836, the operation target region 846, and the operation target region 856 are equal to each other.

Figures 28, 29:
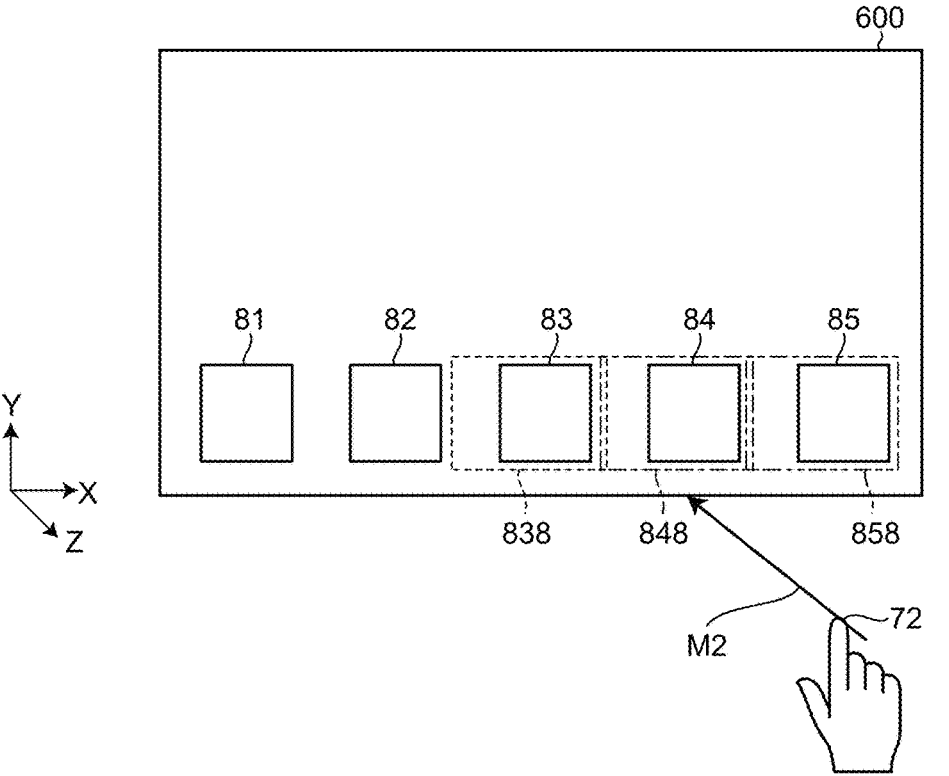
FIG. 28 is a schematic diagram for explaining an example of an expanded operation target region according to the eleventh modification.
FIG. 29 is a schematic diagram for explaining an example of an expanded operation target region according to the eleventh modification.

For example, in FIG. 27, the action detection unit 17 detects action of the user UR before selecting the button in the operation target region expanded by the operation region adjustment unit 16 based on the taken image obtained by imaging the user UR. As illustrated in FIG. 28, the operation region adjustment unit 16 moves each of the operation target regions in accordance with action of the fingertip 72 of the user UR.

The following describes processing executed by the operation region adjustment unit 16 in a state in which the fingertip 72 of the user UR is moving in the positive direction of the X-axis to the right of the electronic device 600 with reference to FIG. 28.

FIG. 28 is a schematic diagram for explaining an example of the expanded operation target region according to the eleventh modification. Similarly to FIG. 27, FIG. 28 illustrates the electronic device 600, and the button 81, the button 82, the button 83, the button 84, and the button 85 output by the electronic device 600. FIG. 28 also illustrates an operation target region 837 corresponding to the button 83, an operation target region 847 corresponding to the button 84, and an operation target region 857 corresponding to the button 85.

Positions in the X-axis direction of the operation target region 837, the operation target region 847, and the operation target region 857 in FIG. 28 are moved to the right as compared with the positions in the X-axis direction of the operation target region 836, the operation target region 846, and the operation target region 856 in FIG. 27. This is a state as a result of moving the positions in the X-axis direction of the operation target region 837, the operation target region 847, and the operation target region 857 toward the positive direction of the X-axis by the operation region adjustment unit 16 in accordance with the action of the fingertip 72 of the user UR moving toward the positive direction of the X-axis as indicated by an arrow M1. That is, in a case in which the action detection unit 17 detects an action moving toward a first direction indicating the left and right on the front of the operation regions, the operation region adjustment unit 16 moves the operation target region after being expanded toward the first direction.

Next, the following describes processing executed by the operation region adjustment unit 16 in a state in which the fingertip 72 of the user UR is moving in the negative direction of the X-axis toward the left of the electronic device 600 with reference to FIG. 29.

FIG. 29 is a schematic diagram for explaining an example of the expanded operation target region according to the eleventh modification. Similarly to FIG. 27, FIG. 29 illustrates the electronic device 600, and the button 81, the button 82, the button 83, the button 84, and the button 85 output by the electronic device 600. FIG. 29 also illustrates an operation target region 838 corresponding to the button 83, an operation target region 848 corresponding to the button 84, and an operation target region 858 corresponding to the button 85.

Positions in the X-axis direction of the operation target region 838, the operation target region 848, and the operation target region 858 in FIG. 29 are moved to the left as compared with the positions in the X-axis direction of the operation target region 836, the operation target region 846, and the operation target region 856 in FIG. 27. This is a state as a result of moving the positions in the X-axis direction of the operation target region 838, the operation target region 848, and the operation target region 858 toward the negative direction of the X-axis by the operation region adjustment unit 16 in accordance with the action of the fingertip 72 of the user UR moving toward the negative direction of the X-axis as indicated by an arrow M2. That is, in a case in which the action detection unit 17 detects an action moving toward the first direction indicating the left and right on the front of the operation regions, the operation region adjustment unit 16 moves the operation target region after being expanded toward the first direction.

Next, the following describes an action selecting the button by the fingertip 72 of the user UR after the operation region adjustment unit 16 has moved each of the expanded operation target regions in accordance with the action of the fingertip 72 of the user UR.

For example, in FIG. 28, the action detection unit 17 detects an action selecting the button 84 by the user UR in the operation target region expanded by the operation region adjustment unit 16 based on the taken image obtained by imaging the user UR. For example, the action detection unit 17 detects the action selecting the button 84 by the user UR in the operation target region expanded by the operation region adjustment unit 16 in a case in which the fingertip 72 of the user UR enters a range closer to the electronic device 600 than the virtual operation region AR100 and the fingertip 72 of the user UR stops moving for a certain time in the detection enabled region AR200.

The operation region adjustment unit 16 then expands a size of the operation target region 847 corresponding to the selected button 84, and reduces sizes of the operation target region 837 and the operation target region 857 adjacent to the operation target region 847.

Figure 30:
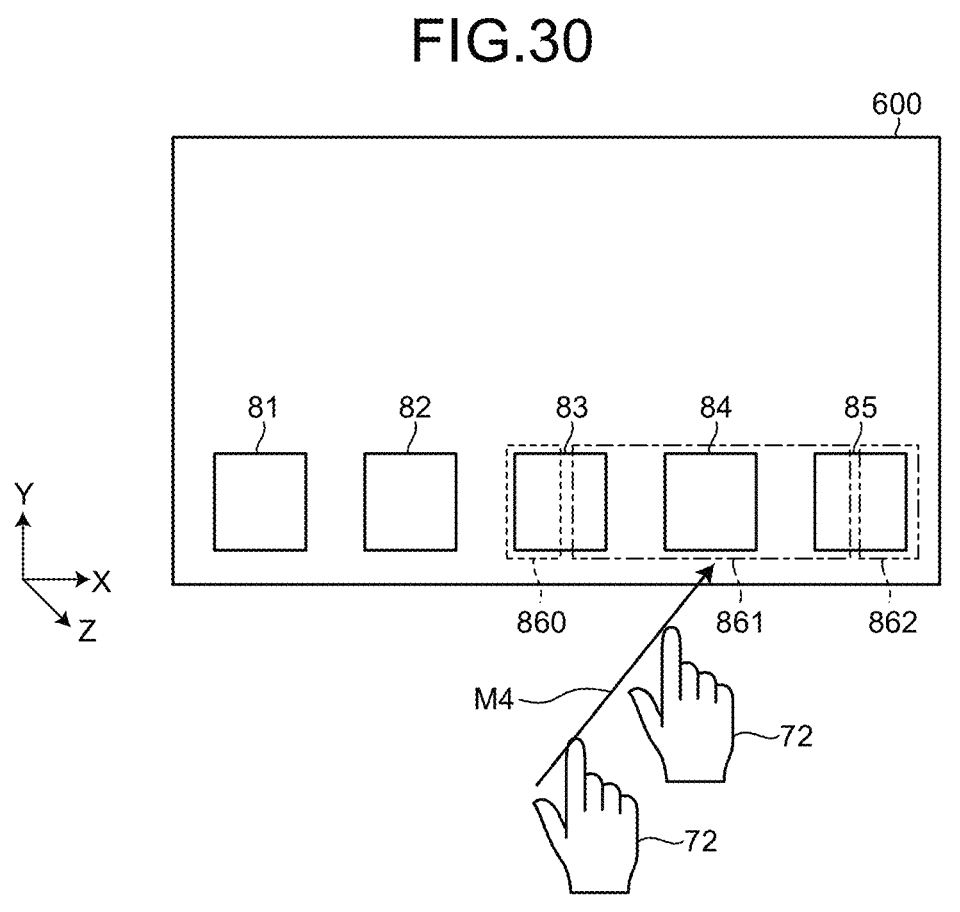

FIG. 30 is a schematic diagram for explaining an example of the expanded operation target region according to the eleventh modification. FIG. 30 is a schematic diagram of a state in which the user UR illustrated in FIG. 28 selects the button 84. Similarly to FIG. 28, FIG. 30 illustrates the electronic device 600, and the button 81, the button 82, the button 83, the button 84, and the button 85 output by the electronic device 600. FIG. 30 illustrates a reduced operation target region 860 corresponding to the button 83, an expanded operation target region 861 corresponding to the button 84, and a reduced operation target region 862 corresponding to the button 85.

Herein, among the operation target regions in FIG. 30, a size of the operation target region 861 corresponding to the button 84 selected by the user UR is the largest, a size of the operation target region 862 that is adjacent to the operation target region 861 and distant from the center of the user UR is smaller, and a size of the operation target region 860 that is adjacent to the operation target region 861 and positioned in front of the user UR is further smaller. The size of the operation target region 862 and the size of the operation target region 860 are smaller than the size of the operation target region 861. That is, in a case in which the action detection unit 17 detects an action selecting one of the operation regions, the operation region adjustment unit 16 expands the size of the operation target region corresponding to the selected operation region, and reduces the sizes of the other operation target regions adjacent to the selected operation target region.

Regarding FIG. 30, described is a state in which the user UR illustrated in FIG. 28 selects the button 84. However, FIG. 30 can also be applied to a state in which the user UR selects the button 84 in schematic diagrams illustrated in FIG. 23, FIG. 24, FIG. 26, and FIG. 29. For example, when the fingertip 72 of the user UR is moving toward the electronic device 600 along the Z-axis in front of a point where the operation target regions in FIG. 27 overlap each other, the action detection unit 17 detects an action selecting the button by the user UR. In this case, the action detection unit 17 determines that a button closer to the fingertip of the user UR is selected. Furthermore, for example, when the fingertip 72 of the user UR performs selecting action in a region closer to the button 84 than the button 83 in front of a region in which the operation target region 836 overlaps the operation target region 846, the action detection unit 17 detects the action selecting the button 84 by the user UR.

Fourth Embodiment

A fourth embodiment describes a selecting operation in which the predetermined action corresponds to swinging back action of the fingertip 72 of the user UR.

Figure 31:
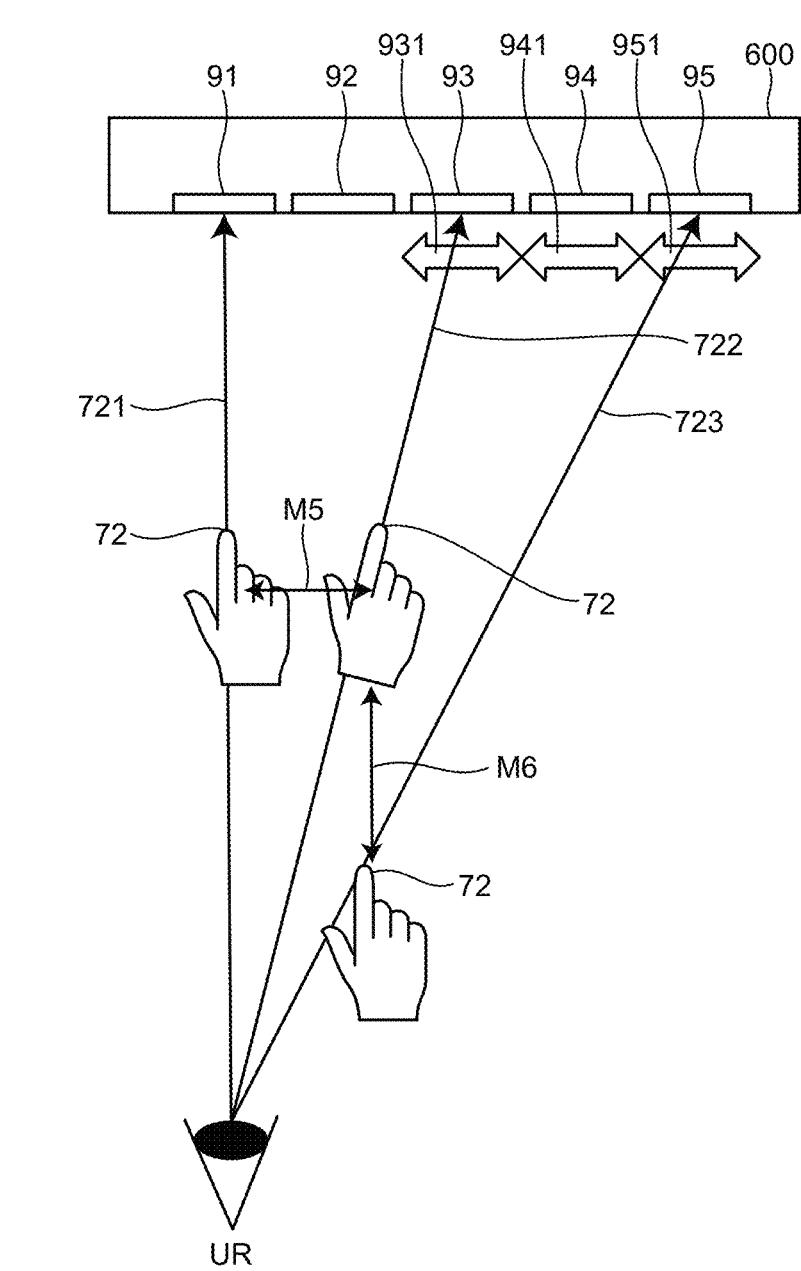
FIG. 31 is a schematic diagram for explaining operation processing of an information processing device according to a third comparative example.

FIG. 31 is a schematic diagram for explaining operation processing of the information processing device according to a third comparative example. FIG. 31 illustrates the electronic device 600, an eye of the user UR who operates the electronic device 600, the fingertip 72 of the user UR operating the electronic device 600, and a plurality of buttons output by the electronic device 600. The buttons include, for example, a button 91, a button 92, a button 93, a button 94, and a button 95. An arrow 931, an arrow 941, and an arrow 951 indicate operation regions to be expanded corresponding to the button 93, the button 94, and the button 95.

For example, FIG. 31 is a schematic diagram in a case in which the user UR performs sliding action in the X-axis direction using the fingertip 72 of the user UR from the button 91 to the button 93 positioned in front of the user UR as indicated by an arrow M5, and the fingertip 72 of the user UR performs operation of selecting the button 93.

FIG. 31 is a schematic diagram in a case in which the user UR performs sliding action in the Z-axis direction using the fingertip 72 of the user UR as indicated by an arrow M6 in a state of selecting the button 93. Performing sliding action in the Z-axis direction by the fingertip of the user UR means, for example, swinging back action such as an action drawing the fingertip 72 of the user UR toward the user UR. That is, the swinging back action means an action moving toward a third direction away from the front of the operation target region corresponding to the selected operation region. At this point, a position of the eye of the user UR is not changed.

In a case in which the user UR performs sliding action in the Z-axis direction using the fingertip 72 of the user UR as indicated by the arrow M6 in a state of selecting the button 93, a direction of the eye of the user UR and the fingertip 72 of the user UR moves from an arrow 722 to an arrow 723 corresponding to the button 95, and a state of selecting the button 95 is caused in some cases. This is because a direction connecting the eye of the user UR and the fingertip 72 is changed due to the swinging back action performed by the user UR, and an operation angle between the user UR and the button 93 is changed to an operation angle between the user UR and the button 95, so that a state of selecting the button 95 is caused.

Due to this, the state of selecting the button 95 is caused even though the button 93 is selected, so that the user UR may feel that it is difficult to perform operation. Thus, the fourth embodiment describes the information processing device that can improve the selecting operation corresponding to the swinging back action of the fingertip 72 of the user UR.

Figure 32:
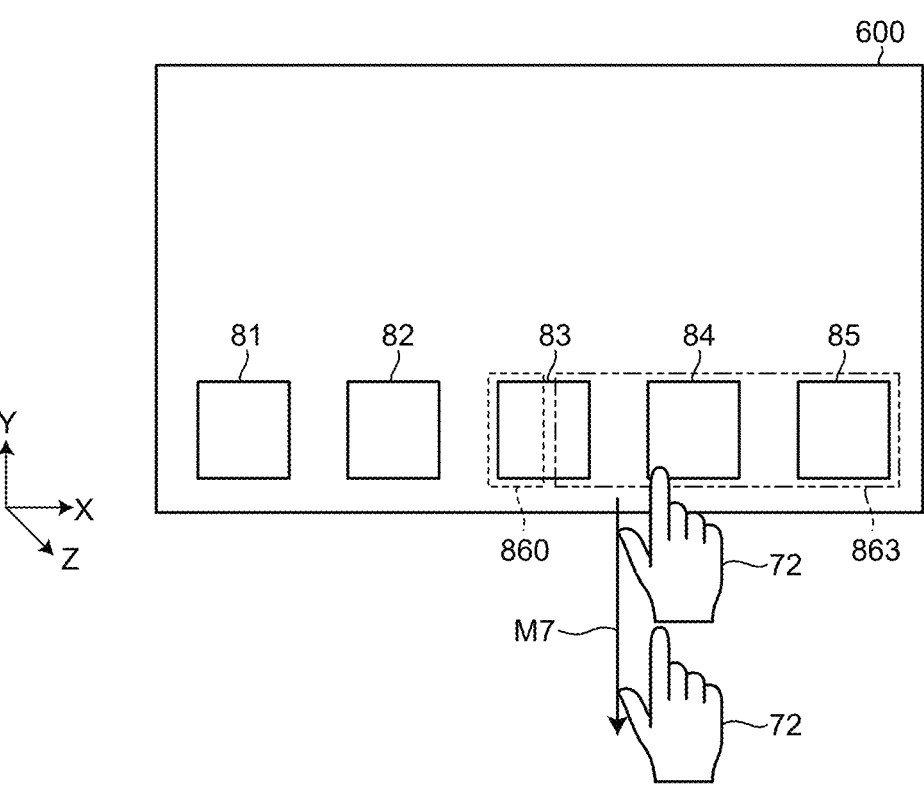
FIG. 32 is a schematic diagram for explaining an example of an expanded operation target region according to a fourth embodiment.

FIG. 32 is a schematic diagram for explaining an example of the expanded operation target region according to the fourth embodiment. FIG. 32 illustrates the electronic device 600, the fingertip 72 of the user UR operating the electronic device 600, and the button 81, the button 82, the button 83, the button 84, and the button 85 output by the electronic device 600. FIG. 32 is a schematic diagram of a state in which the user UR proceeds from the state of the fingertip 72 of the user UR illustrated in FIG. 31 to the swinging back action.

For example, in FIG. 32, in a case in which the fingertip 72 of the user UR selects the button 84 and the fingertip 72 of the user UR is moved in the positive direction of the Z-axis as indicated by an arrow M7, the operation region adjustment unit 16 further expands the operation target region 861 corresponds to the button 84 to be an operation target region 863 larger than the operation target region 861.

That is, in a case in which the action detection unit 17 detects an action moving toward the third direction away from the front of the operation target region corresponding to the selected operation region, the operation region adjustment unit 16 further expands the size of the operation target region corresponding to the selected operation region. The operation region adjustment unit 16 then returns the size to be the size of the operation target region before being expanded after a certain time has elapsed. Herein, the certain time is 1 second. The certain time is not limited to 1 second, and can be optionally set. Due to this, the operation region adjustment unit 16 can set the operation region corresponding to the swinging back action of the user UR.

Figure 33:
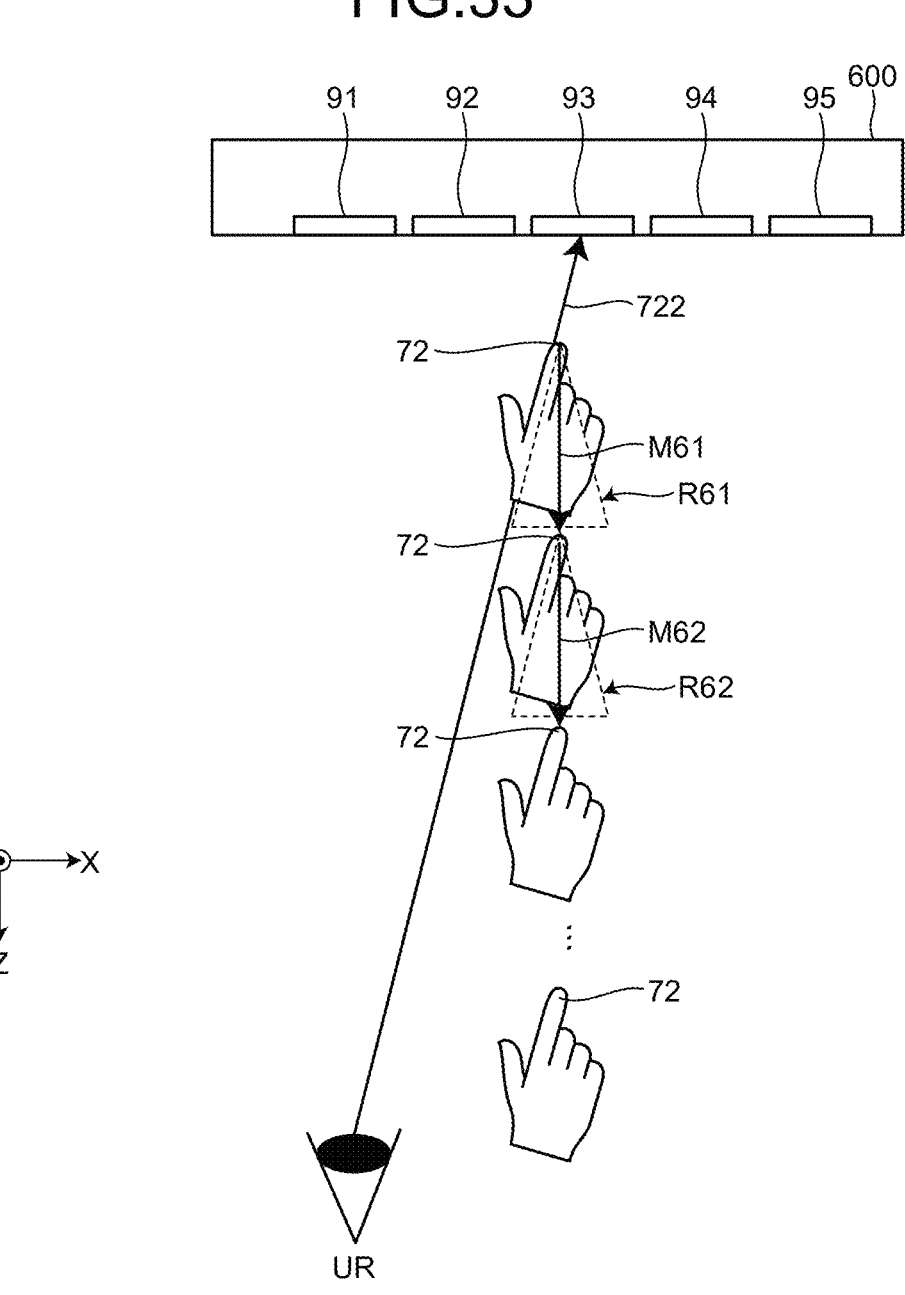
FIG. 33 is a schematic diagram illustrating an example of content of operation processing for an expanded operation target region according to the fourth embodiment.

FIG. 33 is a schematic diagram illustrating an example of content of operation processing for the expanded operation target region according to the fourth embodiment. Regarding FIG. 33, the following describes processing of detecting the swinging back action of the user UR by the action detection unit 17 of the control unit 10.

FIG. 33 illustrates the electronic device 600, the eye of the user UR who operates the electronic device 600, the fingertip 72 of the user UR operating the electronic device 600, and a plurality of buttons output by the electronic device 600. The buttons include, for example, the button 91, the button 92, the button 93, the button 94, and the button 95. A direction of the eye of the user UR and the fingertip 72 of the user UR is the arrow 722 indicating the button 93. FIG. 33 illustrates a state in which the fingertip 72 of the user UR performs swinging back action along an arrow M61 and an arrow M62 in order while the fingertip 72 of the user UR is selecting the button 93.

Regarding the swinging back action of the user UR, in a case of determining that there is a possibility of swinging for at least one of a moving speed, a moving direction, and a movement distance of movement of the fingertip 72 of the user UR, the action detection unit 17 determines the action to be the swinging back action.

Specifically, in a case in which the moving speed in the Z-direction in which the fingertip 72 of the user UR moves, as indicated by the arrow M61 and the arrow M62 illustrated in FIG. 33, is equal to or larger than a predetermined speed threshold, the action detection unit 17 determines that there is a possibility of swinging. For example, regarding the moving speed in the Z-direction, in a case in which the moving speed corresponding to the movement distance in the Z-direction of the fingertip 72 of the user UR at time $t_x$ and time $t_{x+1}$ is equal to or higher than 0.1 (m/s), the action detection unit 17 determines that there is a possibility of swinging. The predetermined speed threshold is described to be 0.1 (m/s), but the embodiment is not limited thereto.

Specifically, in a case in which the fingertip of the user UR is present in a range R61 and a range R62 each having a substantially triangular shape as illustrated in FIG. 33 and moves in the positive direction of the Z-direction, the action detection unit 17 determines that there is a possibility of swinging. For example, the action detection unit 17 calculates a direction at the time $t_{x+1}$ based on a position at the time $t_x$, and if a calculated moving direction is equal to or smaller than a predetermined angle, the action detection unit 17 determines that there is a possibility of swinging. The moving direction may be calculated as $t_{x+y}$ for $t_x$. Herein, y is assumed to be an optional value.

Furthermore, specifically, in a case in which the movement distance of the fingertip 72 of the user UR in the Z-direction is equal to or larger than a predetermined distance threshold as indicated by the arrow M61 and the arrow M62 illustrated in FIG. 33, the action detection unit 17 determines that there is a possibility of swinging. For example, the action detection unit 17 specifies the movement distance of the fingertip 72 of the user UR in the Z-direction based on the taken image obtained by imaging the user UR, and determines that there is a possibility of swinging in a case in which five or more frames in which the fingertip 72 of the user UR moves in the Z-direction by 10 (cm) or more are continuously present in the taken image.

The predetermined distance threshold is described as 10 (cm), but the embodiment is not limited thereto. In the above description, the number of frames for determining the possibility of swinging is equal to or larger than five, but the embodiment is not limited thereto. For example, the action detection unit 17 may calculate a distance at the time tx+1 based on a position at the time tx, and determine that there is a possibility of swinging in a case in which the calculated movement distance is equal to or larger than the predetermined distance.

As described above, in a case in which an action moving toward the third direction away from the front of the operation target region corresponding to the selected operation region is detected, the control device according to the fourth embodiment of the present disclosure further expands the size of the operation target region corresponding to the selected operation region, and returns the size to be the size of the operation target region before being expanded after a certain time has elapsed.

Due to this, for example, in a case in which the operator performs swinging back action after selecting the operation region, the control device can avoid a situation in which the operator selects the other operation region against his/her will. Thus, the control device can improve operability for the user.

Twelfth Modification

In the third embodiment, the fourth embodiment, the tenth modification, and the eleventh modification described above, described is a case in which the user UR is positioned outside the region in front of the electronic device 600, but the embodiment is not limited thereto. The third embodiment, the fourth embodiment, the tenth modification, and the eleventh modification may also be applied to a case in which the user UR is positioned in front of and at the center of the electronic device 600, or a case in which the user UR is positioned inside the region in front of the electronic device 600.

The embodiments of the present disclosure have been described above, but the above embodiments are merely examples, and do not intend to limit the scope of the invention. These novel embodiments can be implemented in various other forms, and can be variously omitted, replaced, and modified without departing from the gist of the present invention. These novel embodiments and modifications thereof are encompassed by the scope and the gist of the invention, and also encompassed by the invention described in Claims and an equivalent thereof. Furthermore, constituent elements in different embodiments and modifications may be appropriately combined with each other.

A word of " . . . part" in the embodiment described above may be replaced with other words such as " . . . circuit (circuitry)", " . . . assembly", " . . . device", " . . . unit", or " . . . module".

In the embodiments described above, the present disclosure is configured by using hardware by way of example, but the present disclosure can also be implemented by software in cooperation with hardware.

Each functional block used in the description of the embodiments described above is typically implemented as an LSI, which is an integrated circuit. The integrated circuit may control each functional block used in the description of the embodiments described above, and may include an input terminal and an output terminal. These may be individually made into one chip, or may be made into one chip including part or all of them. The LSI is used herein, but it is called an IC, a system LSI, a super LSI, or an ultra LSI depending on integration.

A method of making an integrated circuit is not limited to the LSI, but may be implemented by using a dedicated circuit or a general-purpose processor, and a memory. After manufacturing the LSI, a field programmable gate array (FPGA) that can be programmed, and a reconfigurable processor that can reconfigure connection or setting of a circuit cell inside the LSI may be used.

Furthermore, if a technique of making an integrated circuit is developed in place of the LSI due to progress of semiconductor technology or another derivative technology, functional blocks may be integrated by using this technique as a matter of course. There is a possibility of application of biotechnology.

The information processing device according to the present disclosure can improve operability for the user.

Notes

With the above recitation of the embodiments, the following techniques are disclosed.

Technique 1

An information processing device including:
a position detection unit configured to detect a position of an operator;
an action detection unit configured to detect a predetermined action of the operator in an operation region indicating a region that is defined by connecting the position of the operator detected by the position detection unit and an operation target region set on at least one electronic device;
a processing execution unit configured to execute processing associated with the operation target region in a case in which the action detection unit detects the predetermined action; and
an operation region adjustment unit configured to expand the operation region in a case in which the position of the operator detected by the position detection unit is outside a region in front of the at least one electronic device.

Technique 2

The information processing device according to Technique 1, wherein
the at least one electronic device is a display,
a vicinity button region and a distant button region are present on the display as at least two operation target regions, the vicinity button region indicating a region of a vicinity button arranged closer to the operator, the distant button region indicating a region of a distant button arranged farther from the operator, and
the operation region adjustment unit is configured to set the operation region corresponding to each of the vicinity button region and the distant button region such that a first angle indicating an angle formed by a first straight line and a second straight line is equal to a second angle indicating an angle formed by a third straight line and a fourth straight line, the first straight line connecting the position of the operator and one end part of the operation region corresponding to the vicinity button region in a direction of a center line connecting a center of the vicinity button region and a center of the distant button region, the second straight line connecting the position of the operator and another end part of the operation region corresponding to the vicinity button region in the direction of the center line, the third straight line connecting the position of the operator and one end part of the operation region corresponding to the distant button region in the direction of the center line, the fourth straight line connecting the position of the operator and another end part of the operation region corresponding to the distant button region in the direction of the center line.

Technique 3

The information processing device according to Technique 2, wherein the first straight line is a straight line connecting a right end part of the vicinity button region and the position of the operator, the second straight line is a straight line connecting a left end part of the vicinity button region and the position of the operator, the third straight line is a straight line connecting a right end part of the distant button region and the position of the operator, and the fourth straight line is a straight line connecting a left end part of the distant button region and the position of the operator.

Technique 4

The information processing device according to Technique 2, wherein the first straight line is a straight line connecting an upper end part of the vicinity button region and the position of the operator, the second straight line is a straight line connecting a lower end part of the vicinity button region and the position of the operator, the third straight line is a straight line connecting an upper end part of the distant button region and the position of the operator, and the fourth straight line is a straight line connecting a lower end part of the distant button region and the position of the operator.

Technique 5

The information processing device according to Technique 1, wherein the at least one electronic device is a display, a first button region indicating a region in which a first button is arranged and a second button region indicating a region in which a second button is arranged are present on the display as at least two operation target regions, a length of the first button region is smaller than a length of the second button region in a direction of a center line connecting a center of the first button region and a center of the second button region, and the operation region adjustment unit is configured to set the operation region corresponding to each of the first button region and the second button region such that a first angle indicating an angle formed by a first straight line and a second straight line is equal to a second angle indicating an angle formed by a third straight line and a fourth straight line, the first straight line connecting the position of the operator and one end part of the operation region corresponding to the first button region in the direction of the center line, the second straight line connecting the position of the operator and another end part of the operation region corresponding to the first button region in the direction of the center line, the third straight line connecting the position of the operator and one end part of the operation region corresponding to the second button region in the direction of the center line, the fourth straight line connecting the position of the operator and another end part of the operation region corresponding to the second button region in the direction of the center line.

Technique 6

The information processing device according to Technique 1, wherein the at least one electronic device includes a first electronic device and a second electronic device, and the operation region adjustment unit is configured to expand the operation region of at least one of the first electronic device and the second electronic device in a case in which the position of the operator detected by the position detection unit is outside a front region corresponding to a front of the first electronic device and the second electronic device.

Technique 7

The information processing device according to Technique 1, wherein the operation region adjustment unit is configured to determine a size of the operation region after being expanded based on a positional relation between the at least one electronic device and the operator.

Technique 8

The information processing device according to Technique 7, wherein the at least one electronic device is a display, and the operation region adjustment unit is configured to determine the size of the operation region after being expanded based on a size of the operation region in a case in which the display is disposed in front of the operator while a shortest distance between the display and the operator is kept equal.

Technique 9

The information processing device according to Technique 1, wherein the at least one electronic device is a display, and in a case in which a plurality of operation regions are present on the display, the operation region adjustment unit is configured to determine, in a case in which the action detection unit detects an action selecting one of the plurality of operation regions, a size of the operation target region after being expanded in accordance with the predetermined action.

Technique 10

The information processing device according to Technique 9, wherein the operation region adjustment unit is configured to:

in a case in which sizes of operation target regions after being expanded corresponding to the plurality of operation regions are equal to each other, expand the size of the operation target region after being expanded corresponding to the operation region selected; and reduce a size of the operation target region after being expanded corresponding to another operation region adjacent to the operation region selected.

Technique 11

The information processing device according to Technique 9, wherein the operation region adjustment unit is configured to:

in a case in which sizes of operation target regions after being expanded corresponding to the plurality of operation regions are different from each other, expand the size of the operation target region after being expanded corresponding to the operation region selected, and reduce a size of the operation target region after being expanded corresponding to another operation region adjacent to the operation region selected.

Technique 12

The information processing device according to Technique 1, wherein the at least one electronic device is a display, and the operation region adjustment unit is configured to, in a case in which a plurality of operation regions are present on the display, move the operation target region after being expanded in accordance with the predetermined action, in a case in which the action detection unit detects an action selecting one of the plurality of operation regions.

Technique 13

The information processing device according to Technique 12, wherein the operation region adjustment unit is configured to, in a case in which the action detection unit detects an action moving toward a first direction indicating left and right of a front of the plurality of operation regions, move the operation target region after being expanded toward the first direction.

Technique 14

The information processing device according to Technique 9 or 12, wherein the operation region adjustment unit is configured to, in a case in which the action detection unit detects an action selecting one of the plurality of operation regions, expand a size of an operation target region corresponding to the operation region selected and reduce a size of another operation target region adjacent to the operation target region selected.

Technique 15

The information processing device according to Technique 14, wherein the operation region adjustment unit is configured to, in a case in which the action detection unit detects an action moving toward a third direction away from a front of the operation target region corresponding to the operation region selected, further expand the size of the operation target region corresponding to the operation region selected, and return it to be the size of the operation target region before being expanded after a certain time has elapsed.

Technique 16

An information processing system including an imaging unit and an information processing device, wherein the imaging unit images a user as an operator, and the information processing device includes:

a position detection unit configured to detect a position of the operator based on an image taken by the imaging unit;

an action detection unit configured to detect a predetermined action of the operator in an operation region indicating a region that is defined by connecting the position of the operator detected by the position detection unit and an operation target region set on at least one electronic device;

a processing execution unit configured to execute, in a case in which the action detection unit detects the predetermined action, processing associated with the operation target region; and an operation region adjustment unit configured to expand the operation region in a case in which the position of the operator detected by the position detection unit is outside a region in front of the at least one electronic device.

Technique 17

An information processing method executed by an information processing device, the information processing method including:

detecting a position of an operator;

detecting a predetermined action of the operator in an operation region indicating a region that is defined by connecting the position of the operator detected at the detecting and an operation target region set on at least one electronic device;

executing processing associated with the operation target region in a case in which the predetermined action is detected at the detecting; and expanding the operation region in a case in which the position of the operator detected at the detecting is outside a region in front of the at least one electronic device.

Technique 18

An information processing program that causes a computer to execute:

detecting a position of an operator;

detecting a predetermined action of the operator in an operation region indicating a region that is defined by connecting the position of the operator detected at the detecting and an operation target region set on at least one electronic device;

executing processing associated with the operation target region in a case in which the predetermined action is detected at the detecting; and expanding the operation region in a case in which the position of the operator detected at the detecting is outside a region in front of the at least one electronic device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device, comprising:

a memory in which a program is stored; and a processor coupled to the memory and, by executing the program, configured to:

detect a position of an operator;

detect a predetermined action of the operator in an operation region that is defined by connecting the position of the operator and an operation target region set on at least one electronic device;

execute processing associated with the operation target region when detecting the predetermined action in the operation region; and expand the operation region in a case in which the position of the operator is outside of a front region that is in front of the at least one electronic device, wherein when viewed from a lower direction of the at least one electronic device, a straight line connecting a center of a breadth of the front region and a center of a breadth of the at least one electronic device is orthogonal to a breadth direction of the front region, the breadth of the front region is equal to the breadth of the at least one electronic device, and the processing associated with the operation target region is executed when the predetermined action is detected in the expanded operation region, in the case in which the position of the operator is outside of the front region.

2. The information processing device according to claim 1, wherein the at least one electronic device is a display, a first button region indicating a region in which a first button is arranged and a second button region indicating a region in which a second button is arranged are present on the display as at least two operation target regions, a length of the first button region is smaller than a length of the second button region in a direction of a center line connecting a center of the first button region and a center of the second button region, and the processor is configured to set the operation region corresponding to each of the first button region and the second button region such that a first angle indicating an angle formed by a first straight line and a second straight line is equal to a second angle indicating an angle formed by a third straight line and a fourth straight line, the first straight line connecting the position of the operator and one end part of the operation region corresponding to the first button region in the direction of the center line, the second straight line connecting the position of the operator and another end part of the operation region corresponding to the first button region in the direction of the center line, the third straight line connecting the position of the operator and one end part of the operation region correspond-ing to the second button region in the direction of the center line, the fourth straight line connecting the position of the operator and another end part of the operation region corresponding to the second button region in the direction of the center line.

3. The information processing device according to claim 1, wherein the at least one electronic device includes a first electronic device and a second electronic device, and the processor is configured to expand the operation region of at least one of the first electronic device or the second electronic device in a second case in which the position of the operator is outside a front region cor-responding to a front of the first electronic device and the second electronic device.

4. An information processing system comprising:

a camera that images a user as the operator; and an information processing device according to claim 1, wherein the processor is configured to detect the position of the operator based on an image taken by the camera.

5. The information processing device according to claim 1, wherein the at least one electronic device is a display, a vicinity button region and a distant button region are present on the display as at least two operation target regions, the vicinity button region indicating a region closer to the operator, the distant button region indi-cating a region farther from the operator, and the processor is configured to set the operation region corresponding to each of the vicinity button region and the distant button region such that a first angle indicat-ing an angle formed by a first straight line and a second straight line is equal to a second angle indicating an angle formed by a third straight line and a fourth straight line, the first straight line connecting the posi-tion of the operator and one end part of the operation region corresponding to the vicinity button region in a direction of a center line connecting a center of the vicinity button region and a center of the distant button region, the second straight line connecting the position of the operator and another end part of the operation region corresponding to the vicinity button region in the direction of the center line, the third straight line connecting the position of the operator and one end part of the operation region corresponding to the distant button region in the direction of the center line, the fourth straight line connecting the position of the operator and another end part of the operation region corresponding to the distant button region in the direc-tion of the center line.

6. The information processing device according to claim 5, wherein the first straight line connects a right end part of the vicinity button region and the position of the operator, the second straight line connects a left end part of the vicinity button region and the position of the operator, the third straight line connects a right end part of the distant button region and the position of the operator, and the fourth straight line connects a left end part of the distant button region and the position of the operator.

7. The information processing device according to claim 5, wherein the first straight line connects an upper end part of the vicinity button region and the position of the operator, the second straight line connects a lower end part of the vicinity button region and the position of the operator, the third straight line connects an upper end part of the distant button region and the position of the operator, and the fourth straight line connects a lower end part of the distant button region and the position of the operator.

8. The information processing device according to claim 1, wherein the processor is configured to determine a size of the operation region after being expanded based on a positional relation between the at least one electronic device and the operator.

9. The information processing device according to claim 8, wherein the at least one electronic device is a display, and the processor is configured to determine the size of the operation region after being expanded based on an initial size of the operation region in a second case in which the display is disposed in front of the operator while a shortest distance between the display and the operator is kept equal.

10. The information processing device according to claim 1, wherein the at least one electronic device is a display, and in a second case in which a plurality of operation regions is present on the display, the processor is configured to determine, when detecting an action selecting one of the plurality of operation regions, the size of the operation target region after being expanded in accordance with the predetermined action.

11. The information processing device according to claim 10, wherein the processor is configured to:

in a second case in which sizes of operation target regions after being expanded corresponding to the plurality of operation regions are equal to each other, expand the size of the operation target region after being expanded corresponding to the one of the plurality of operation regions selected; and reduce the size of the operation target region after being expanded corresponding to another one of the plurality of operation regions adjacent to the one of the plurality of operation regions selected.

12. The information processing device according to claim 10, wherein the processor is configured to:

in a third case in which sizes of operation target regions after being expanded corresponding to the plurality of operation regions are different from each other, expand the size of the operation target region after being expanded corresponding to the operation region selected, and reduce a size of the operation target region after being expanded corresponding to another operation region adjacent to the one of the plurality of operation regions selected.

13. The information processing device according to claim 10, wherein the processor is configured to, when detecting an action selecting one of the plurality of operation regions, expand a size of an operation target region corresponding to the one of the plurality of operation regions selected and reduce a size of another operation target region adjacent to the operation target region corresponding to the one of the plurality of operation regions selected.

14. The information processing device according to claim 13, wherein the processor is configured to, when detecting an action moving toward a third direction away from a front of the operation target region corresponding to the one of the plurality of operation regions selected, further expand the size of the operation target region corresponding to the one of the plurality of operation regions selected, and return the size of the operation target region to a size before being expanded after a certain time has elapsed.

15. The information processing device according to claim 1, wherein the at least one electronic device is a display, and the processor is configured to, in a second case in which a plurality of operation regions is present on the display, move the operation target region after being expanded in accordance with the predetermined action, when detecting an action selecting one of the plurality of operation regions.

16. The information processing device according to claim 15, wherein the processor is configured to, when detecting an action moving toward a first direction indicating left or right of a front of the plurality of operation regions, move the operation target region after being expanded toward the first direction.

17. The information processing device according to claim 15, wherein the processor is configured to, when detecting an action selecting one of the plurality of operation regions, expand a size of an operation target region corresponding to the one of the plurality of operation regions selected and reduce a size of another operation target region adjacent to the operation target region corresponding to the one of the plurality of operation regions selected.

18. The information processing device according to claim 17, wherein the processor is configured to, when detecting an action moving toward a third direction away from a front of the operation target region corresponding to the one of the plurality of operation regions selected, further expand the size of the operation target region corresponding to the one of the plurality of operation regions selected, and return the size of the operation target region to a size before being expanded after a certain time has elapsed.

19. An information processing method executed by an information processing device, the information processing method comprising:

detecting a position of an operator;

detecting a predetermined action of the operator in an operation region that is defined by connecting the position of the operator and an operation target region set on at least one electronic device;

executing processing associated with the operation target region in a first case in which the predetermined action is detected in the operation region by the detecting; and expanding the operation region in a second case in which the position of the operator detected by the detecting is outside of a front region that is in front of the at least one electronic device, wherein when viewed from a lower direction of the at least one electronic device, a straight line connecting a center of a breadth of the front region and a center of a breadth of the at least one electronic device is orthogonal to a breadth direction of the front region, the breadth of the front region is equal to the breadth of the at least one electronic device, and the processing associated with the operation target region is executed when the predetermined action is detected in the expanded operation region, in the second case in which the position of the operator detected by the detecting is outside of the front region.

20. A non-transitory computer-readable medium on which programmed instructions are stored, wherein the programmed instructions, when executed by a computer, cause the computer to perform:

detecting a position of an operator;

detecting a predetermined action of the operator in an operation region that is defined by connecting the position of the operator and an operation target region set on at least one electronic device;

executing processing associated with the operation target region in a first case in which the predetermined action is detected in the operation region by the detecting; and expanding the operation region in a second case in which the position of the operator detected by the detecting is outside of a front region that is in front of the at least one electronic device, wherein when viewed from a lower direction of the at least one electronic device, a straight line connecting a center of a breadth of the front region and a center of a breadth of the at least one electronic device is orthogonal to a breadth direction of the front region, the breadth of the front region is equal to the breadth of the at least one electronic device, and the processing associated with the operation target region is executed when the predetermined action is detected in the expanded operation region, in the second case in which the position of the operator detected by the detecting is outside of the front region.

\* \* \* \* \*